(12) United States Patent
Hahn et al.

(10) Patent No.: US 12,215,894 B2
(45) Date of Patent: Feb. 4, 2025

(54) TOWABLE HEATER

(71) Applicant: Briggs & Stratton, LLC, Wauwatosa, WI (US)

(72) Inventors: Ryan Hahn, Wauwatosa, WI (US); Paul Sabatka, Holdrege, NE (US); Cole Booth, Holdrege, NE (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 0 days.

(21) Appl. No.: 18/207,231

(22) Filed: Jun. 8, 2023

(65) Prior Publication Data

US 2023/0314042 A1    Oct. 5, 2023

Related U.S. Application Data

(63) Continuation of application No. 16/810,753, filed on Mar. 5, 2020, now Pat. No. 11,709,000.

(60) Provisional application No. 62/814,755, filed on Mar. 6, 2019.

(51) Int. Cl.
| | |
|---|---|
| *F24H 9/06* | (2006.01) |
| *B60P 3/00* | (2006.01) |
| *B62D 21/20* | (2006.01) |
| *B62D 63/08* | (2006.01) |
| *F24H 9/18* | (2022.01) |

(52) U.S. Cl.
CPC .............. *F24H 9/06* (2013.01); *B60P 3/00* (2013.01); *B62D 63/08* (2013.01); *F24H 9/18* (2013.01)

(58) Field of Classification Search
CPC ........... B62D 63/08; B62D 21/20; F24H 9/06; F24H 9/18; F24H 3/0488; F24H 3/065; B60P 3/00

See application file for complete search history.

(56) References Cited

U.S. PATENT DOCUMENTS

| | | | |
|---|---|---|---|
| 2,749,904 A * | 6/1956 | Jones | F24H 3/065 126/110 B |
| 4,691,687 A | 9/1987 | Mutchler | |
| 5,517,020 A * | 5/1996 | Lamo | H05B 47/11 315/159 |
| 6,956,493 B1 * | 10/2005 | Youngblood | G08B 23/00 340/567 |
| 2005/0265702 A1 | 12/2005 | Birdsell et al. | |

(Continued)

FOREIGN PATENT DOCUMENTS

| | | | |
|---|---|---|---|
| GB | 2 219 073 | 11/1989 | |
| GB | 2219073 A * | 11/1989 | ............. F24H 3/025 |
| KR | 20070103103 | 10/2007 | |

OTHER PUBLICATIONS

Allmand Maxi-Heat MH 1000 Parts Catalog (2015) https://www.allmand.com/content/dam/allmand/na/en_us/files/manuals/heater/Maxi%20Heat%201000%20Parts%20Manual%20(2015-106807).pdf.

(Continued)

*Primary Examiner* — Steven S Anderson, II
(74) *Attorney, Agent, or Firm* — Foley & Lardner LLP

(57) ABSTRACT

A portable heater includes a housing having an air inlet and an air outlet, one or more burners housing within the housing and configured to heat air passing through the housing from the air inlet to the air outlet, and a duct positioned in a storage compartment of the housing. The duct includes a first end coupled to the storage compartment and a second end extendable from the housing when a door of the storage compartment is in an open position.

14 Claims, 33 Drawing Sheets

(56) References Cited

U.S. PATENT DOCUMENTS

| | | |
|---|---|---|
| 2006/0182429 A1 | 8/2006 | Shapiro et al. |
| 2011/0265779 A1 | 11/2011 | Vandrak et al. |
| 2012/0124501 A1 | 5/2012 | Hunter |
| 2013/0327141 A1 | 12/2013 | Floyd et al. |
| 2015/0276269 A1 | 10/2015 | Paolini |
| 2018/0031266 A1* | 2/2018 | Atchison ................. F24F 11/30 |
| 2018/0078979 A1* | 3/2018 | Intravatola ............... F24F 7/06 |
| 2019/0285270 A1 | 9/2019 | Yoo |

OTHER PUBLICATIONS

Enhanced Flameless Heater—Series Model SH-750 Operator's Manual, 88 pages.
Maxi-Heat—Series Model MH-1000 Operator's and Parts Manual, Aug. 2005, 42 pages.
Maxi-Heat—Series Model MH-1000 Operator's and Parts Manual, Sep. 2011, 51 pages.
Maxi-Heat—Series Model MH-1000 Parts Catalog, 64 pages.
Maxi-Heat—Series Model MH500iQ Mobile Heater Operator's Manual, 112 pages.
Maxi-Heat—Series Model MH500iQ Parts Manual, 200 pages.

\* cited by examiner

TOWABLE HEATER

CROSS-REFERENCE TO RELATED PATENT APPLICATIONS

This application is a Continuation of U.S. patent application Ser. No. 16/810,753, filed Mar. 5, 2020, which claims priority to U.S. Provisional Patent Application No. 62/814,755, filed Mar. 6, 2019, both of which are hereby incorporated by reference herein in their entireties.

BACKGROUND

The present disclosure relates generally to industrial heating devices. More specifically, the present disclosure relates to portable industrial heaters. Generally speaking, portable industrial heaters are specific to different industries. Many conventional portable industrial heaters require different heating capacities depending on the industry of use.

SUMMARY

At least one embodiment relates to a portable industrial heater including a housing having an air inlet and an air outlet, one or more burners housed within the housing and configured to heat air passing through the housing from the air inlet to the air outlet, and a generator selectively providing power to the one or more burners. The air inlet and the air outlet are positioned on a same side of the housing.

Another embodiment relates to a portable industrial heater assembly including a removable heating unit configured to heat air, the removable heating unit comprising a burner and an air outlet. The portable heater assembly further includes a housing portion configured to house one or more fuel tanks and a generator selectively providing power to the removable heating unit, a trailer configured to support the housing portion and the removable heating unit in a stowed position, the trailer comprising one or more trailer wheels, a frame, and a hitch. The removable heating unit is configured to operate remotely from the trailer and the housing portion, the removable heating unit receiving fuel from the one or more fuel tanks and electricity from the generator.

Another embodiment relates to a portable industrial heater including a housing comprising a modular compartment, one or more burners configured to heat air passing through the housing. The housing further comprises one or more additional modular compartments, each additional modular compartment configured to selectively receive at least one of the one or more burners.

BRIEF DESCRIPTION OF THE DRAWINGS

The disclosure will become more fully understood from the following detailed description, taken in conjunction with the accompanying figures, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the figures, a towable heater assembly is shown. The towable heater assembly provides heating for various applications, including, but not limited to, concrete curing, temporary industrial heating, drying out flooded buildings or areas, construction sites, warming the ground for a jobsite, and so on. In addition, in emergency response situations, the towable heater assembly provides a heat source, drying capabilities, and portable power. Ducting is removably coupled to the towable heater assembly and used to direct a heated air flow from the heater to a particular enclosure, area, building, equipment, etc. The towable heater assembly is mounted on a trailer and is configured for easy portability. The heater may also be dismounted from the trailer and supported and/or transported in other ways. In some embodiments, the towable heater assembly includes one or more removable and individually portable heating units. In this way, a separate, smaller heating unit can be positioned within an area (e.g., open door, enclosure) remote from the rest of the towable heater assembly.

The towable heater assembly also includes various compartments and covers configured to house the various components of the heater such that no parts of the heater extend past the overall package (e.g., housing, envelope, frame, etc.) of the heater. For example, no ducting, connection features, outlets, user interfaces, etc., extend past or hang off of the towable heater, or are exposed to elements, such as rain, heat, snow, hail, etc. In this way, the potential for accidentally snagging or damaging a component of the towable heater while moving or operating the heater assembly is reduced. In addition, exposure of the components of the heater assembly to potentially adverse weather conditions is limited.

Figure 28:
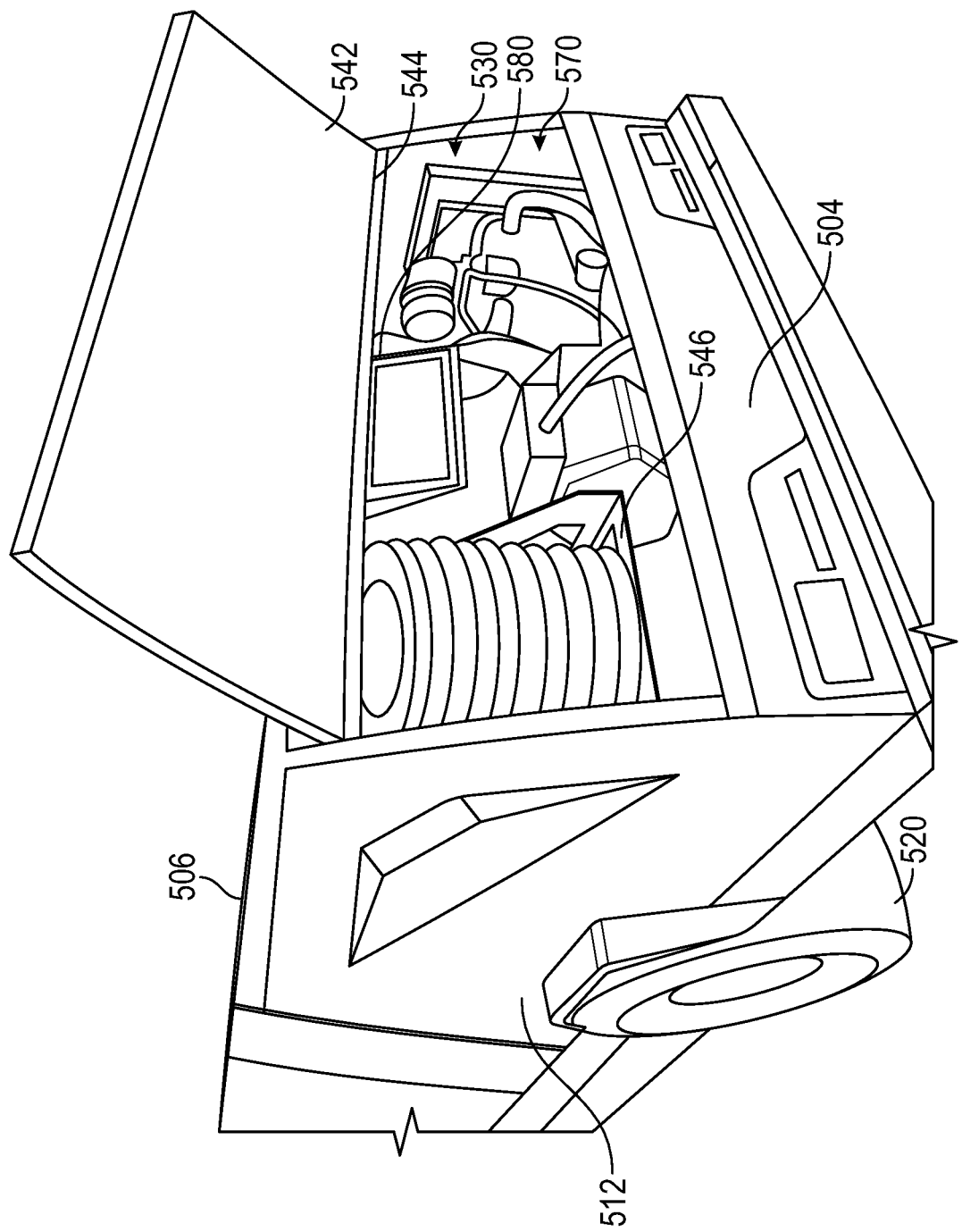
FIG. 28 is a rear perspective view of the towable heater of FIG. 25.
Figure 29:
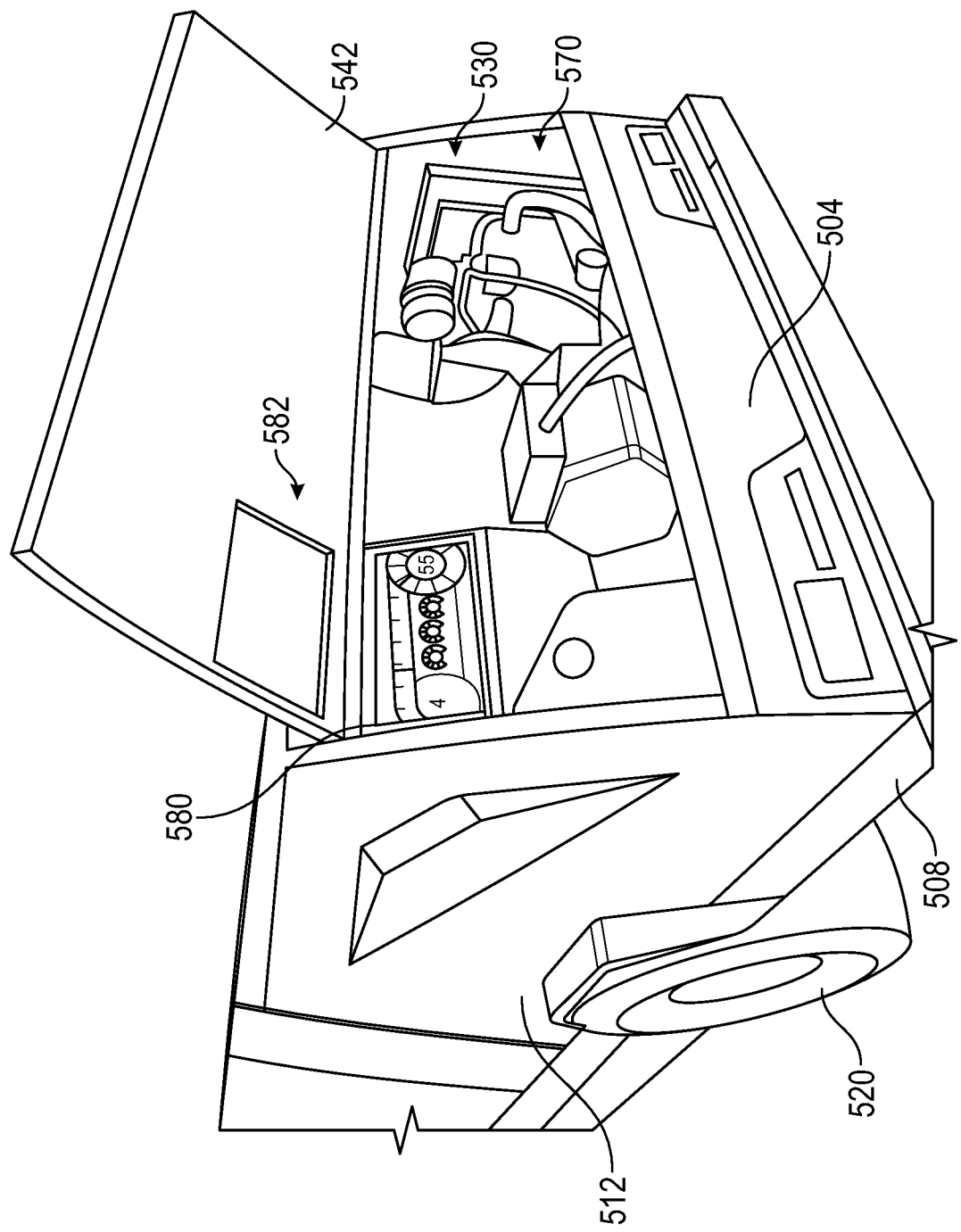
FIG. 29 is a rear perspective view of the towable heater of FIG. 25.

Referring to FIGS. 1-4, a towable heater is shown, according to an exemplary embodiment. The towable heater 10 is configured to produce a heated airflow that can be directed to certain areas, enclosures, equipment, buildings, etc. heat the area and/or dry out the area. The towable heater 10 includes one or more burners 42, 44 (e.g., a first burner 42, second burner 44) and a generator (e.g., generator 530 shown in FIGS. 28-29) providing power to the one or more burners 42, 44. The burners 42, 44 are indirect fired burners. The generator includes an engine and an alternator driven by the engine. The alternator produces electrical power from input mechanical power from the engine. The burners 42, 44 are configured to produce approximately 500,000 British thermal units (BTUs) each, or an approximate combined 1,000,000 BTUs (e.g., using both the first burner 42 and second burner 44 together). In some embodiments, a third burner may be used, thereby producing a combined 1,500,000 BTUs of output. In other embodiments, the burners 42, 44 may produce more or less heat.

Figure 1:
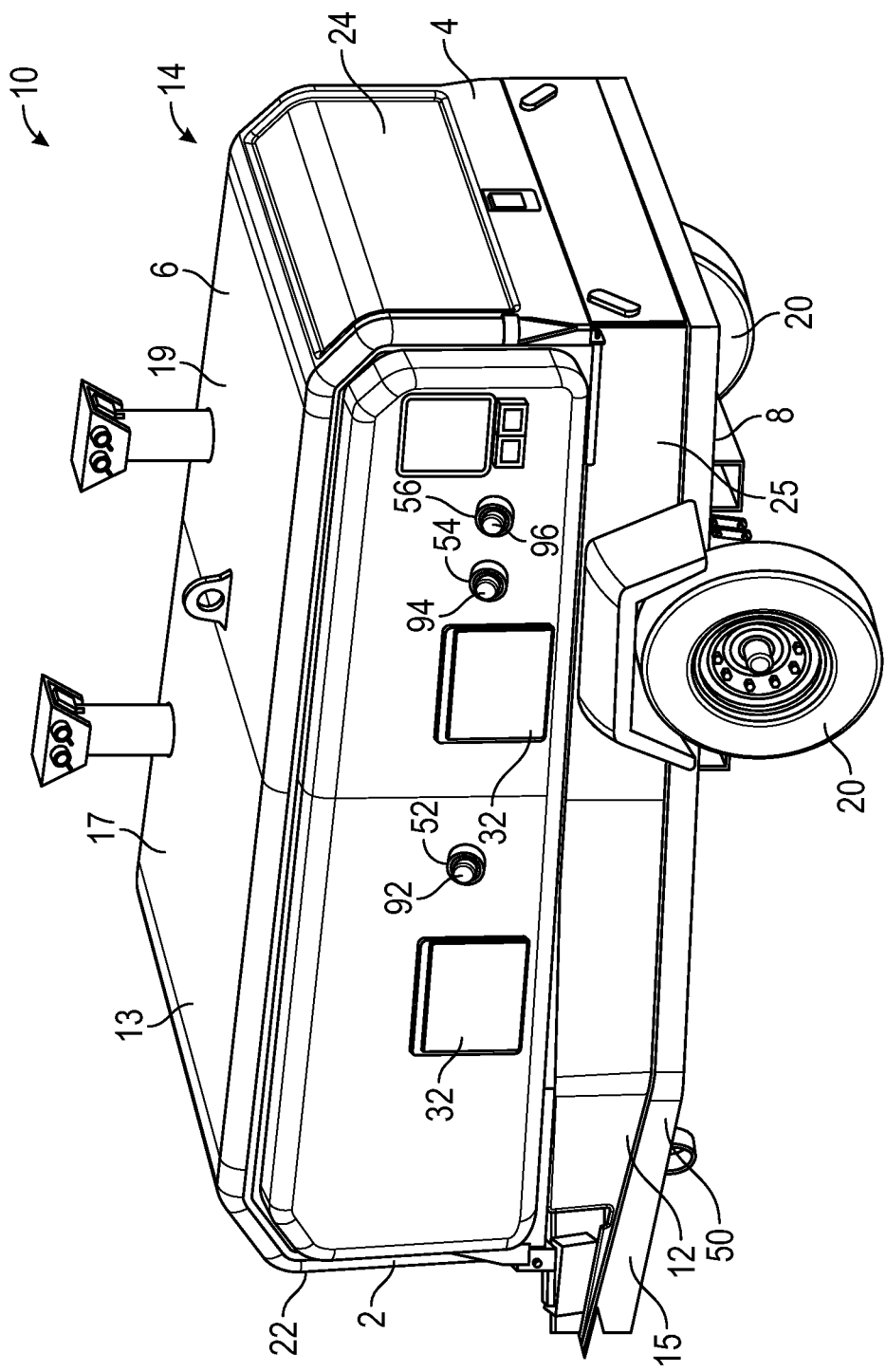
FIG. 1 is a rear perspective view of a towable heater, according to an exemplary embodiment.
Figure 2:
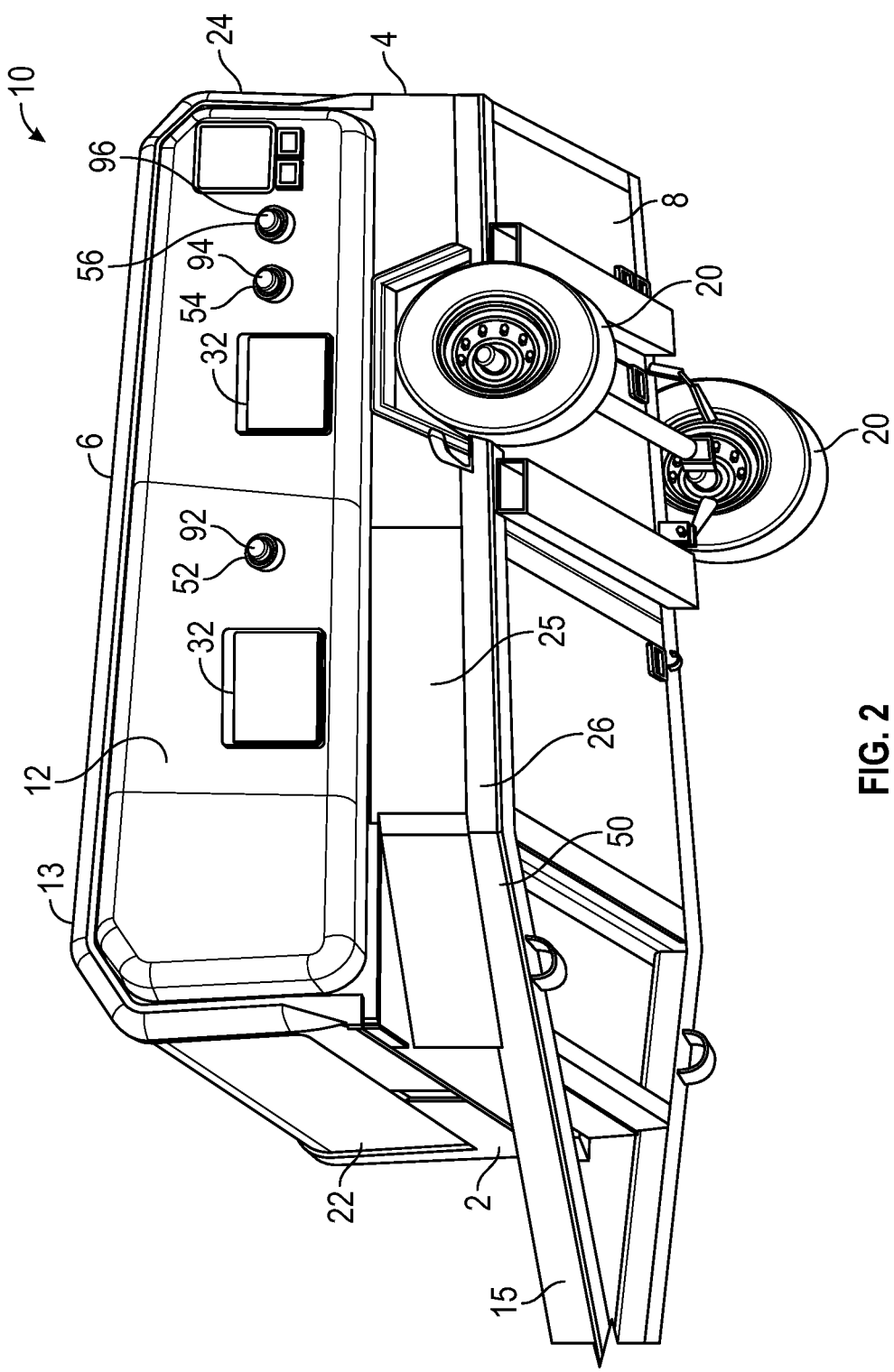
FIG. 2 is a front perspective view of the towable heater of FIG. 1 from the bottom.

The towable heater 10 includes a housing 13 including a front 2, rear 4, top 6, bottom 8, left side 12, and right side 14. In various embodiments, the housing 13 may be made up at least partially of panels, dividers, covers, and doors as will be described further herein (e.g., front storage door 22, rear storage door 24). For example, as shown in FIG. 1, the top 6 is formed from two panels, a first panel 17 and a second panel 19. The incorporation of separate panels may allow the towable heater 10 to be modular in nature. For example, a manufacturer can shorten the length of the towable heater 10 by removing one or more of the panels in situations where only one burner may be used. In other embodiments, the top 6 may be formed as a single piece. The housing 13 also includes a fluid containment system 26 including various trays, compartments, panels, and/or portions, as described further herein. The housing 13 houses the generator and the burners 42, 44, fuel tanks 52, 54, 56, as well as various other stored items (e.g., ducts).

The towable heater 10 is mounted on and supported by a trailer 50 with a frame 15, a hitch 16, and one or more wheels 20 for portability. In some embodiments, a portion of the trailer 50 or frame 15 forms a portion of the housing 13. For example, a perimeter siding 25 (e.g., formed out of sheet metal) or a number of perimeter sidings 25 may be coupled (e.g., fastened, attached) around the entire perimeter of the housing 13 near the bottom 8. The siding 25 may form at least a portion of the left side 12, right side 14, front 2, and rear 4.

Figure 3:
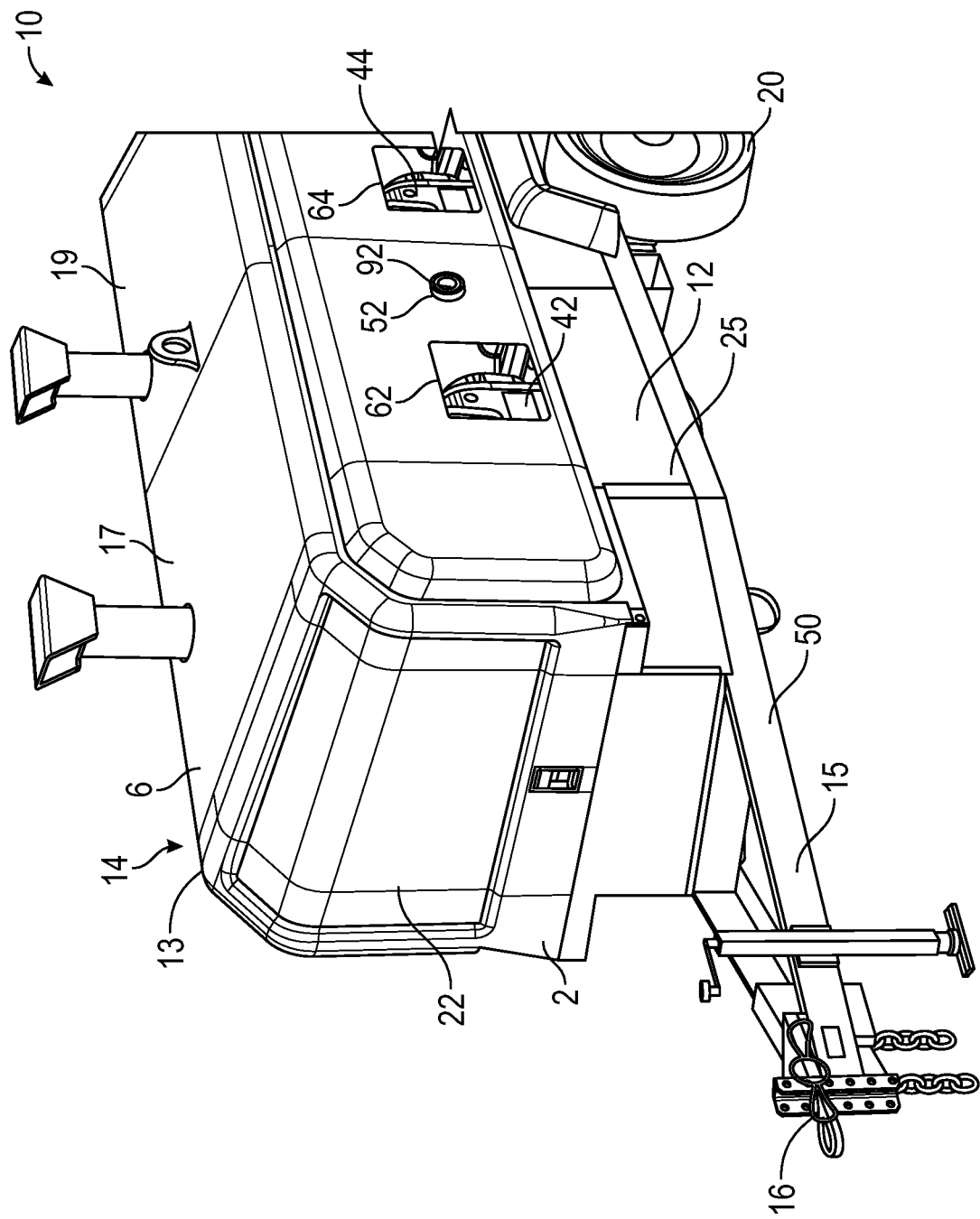
FIG. 3 is a front perspective view of the towable heater of FIG. 1.

Referring to FIG. 3, the towable heater 10 includes a first opening 62 providing access to a first burner 42 and a second opening 64 providing access to a second burner 44. The openings 62, 64 are formed in the left side 12 of the housing 13. In other embodiments, the openings are formed in another side of the housing (e.g., right side 14). The openings 62, 64 are each enclosed by a cover 32 when the burners 42, 44 are not being accessed. The covers 32 may provide a water-tight seal when coupled to the housing 13.

The towable heater 10 includes one or more fuel tanks 52, 54, 56 configured to provide fuel to the generator and the burners 42, 44. For example, a first fuel tank 52 fuels the first burner 42, a second fuel tank 54 fuels the second burner 44, and a third fuel tank 56 fuels the engine of the generator. In some embodiments, only one burner may be used for the towable heater 10 and in such a case, only two fuel tanks are included, one fuel tank for the single burner and one fuel tank for the engine. Each of the fuel tanks 52, 54, 56 include a respective fuel tank cap 92, 94, 96 (e.g., first fuel tank 52 includes a first fuel tank cap 92, second fuel tank 54 includes a second fuel tank cap 94, third fuel tank 56 includes a third fuel tank cap 96). Each of the fuel tank caps 92, 94, 96 are accessible to an operator on the left side 12 of the towable heater 10. As such, all fuel tanks can be refilled by an operator on the same side of the towable heater 10. In some embodiments, the fuel tank caps 92, 94, 96 are accessible to an operator on the other side (e.g., right side 14) of the towable heater 10. A seal may surround the fuel tanks 52, 54, 56 at the housing 13 such that fluids may not enter the housing 13 near the fuel tank caps 92, 94, 96. One or more of the towable heaters described herein may include one or more outlets positioned on the outside of the housing. The outlets may be ground fault circuit interrupter (GFCI) outlets. The outlets provide access to power produced by the generator. The outlets may be covered by a thermoform plastic material.

Figure 4:
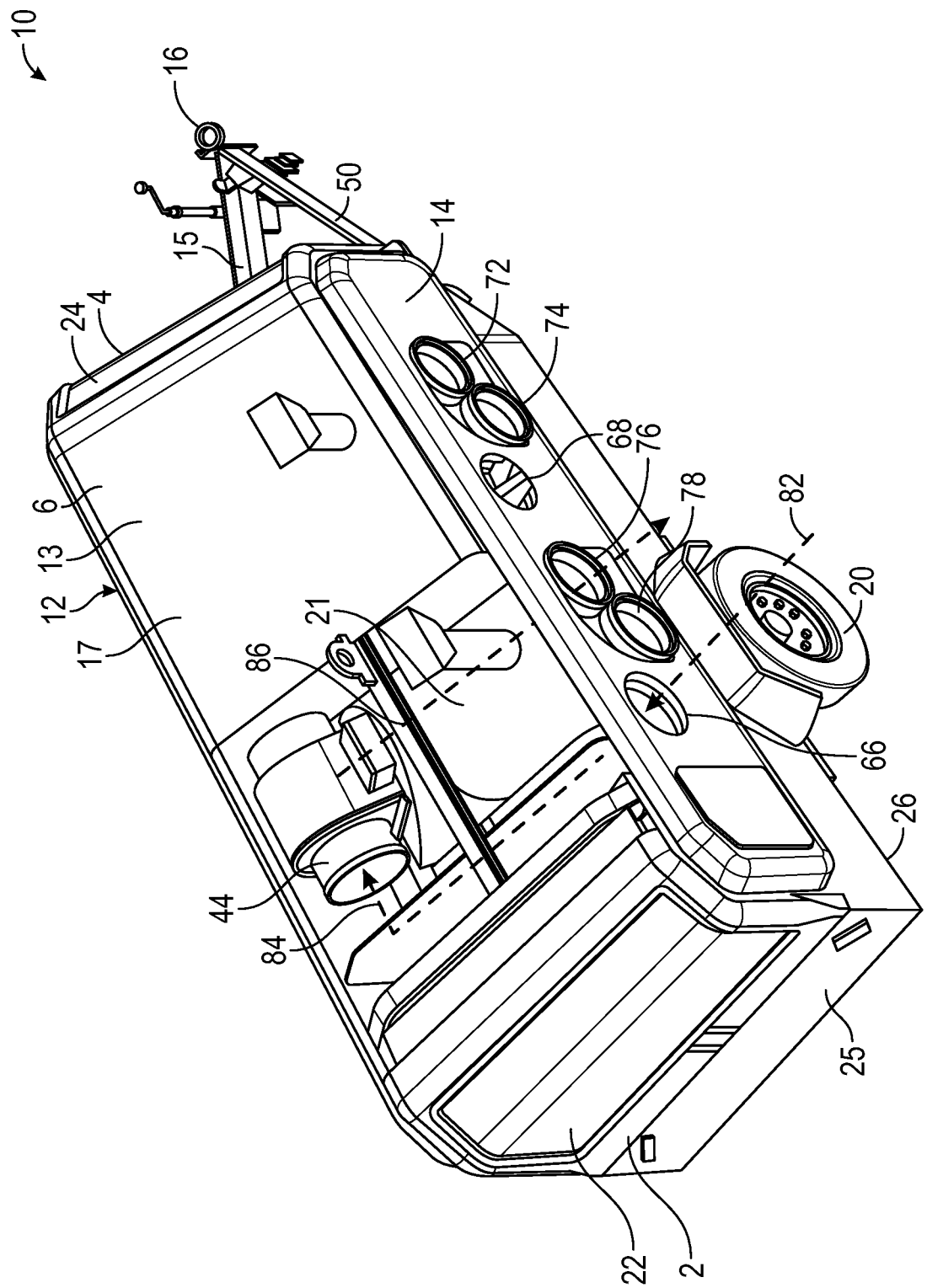
FIG. 4 is a perspective view of the towable heater of FIG. 1.

Referring to FIG. 4, a top view of the towable heater 10 is shown, according to an exemplary embodiment. In this view, a second portion or panel 19 of the top 6 of the housing 13 is removed such that one of the burner compartments (e.g., second compartment 73) is shown. The second compartment 73 includes the second burner 44 and second ducting 21 having an inlet 23, a first outlet 76, and a second outlet 78. Air flows into the second compartment 73 through an air inlet 66 shown by arrow 82 and through the second compartment 73 to the second burner 44 at arrow 84. The air flows past the burner at arrow 86 and through the ducting 21 and exits the towable heater through the first outlet 76 and the second outlet 78. The air flow in the compartment flows in a two-directional manner. Air flow occurs similarly for the first burner 44, where the air flows into a first compartment 71 (FIG. 8) through an air inlet 68, flows past the first burner 42, and exits the first compartment 71 through a first outlet 72 and a second outlet 74 (e.g., of a first ducting). Accordingly, dual air inlets and dual air intake paths are used, one air inlet and air intake path for each burner. In addition, the air inlets and outlets are positioned on the same side of the towable heater 10 as each other. For example, the air inlets and outlets for each compartment 71, 73 are positioned on the right side 14 of the towable heater 10. In other embodiments, the air inlets and outlets can be otherwise positioned.

Figure 5:
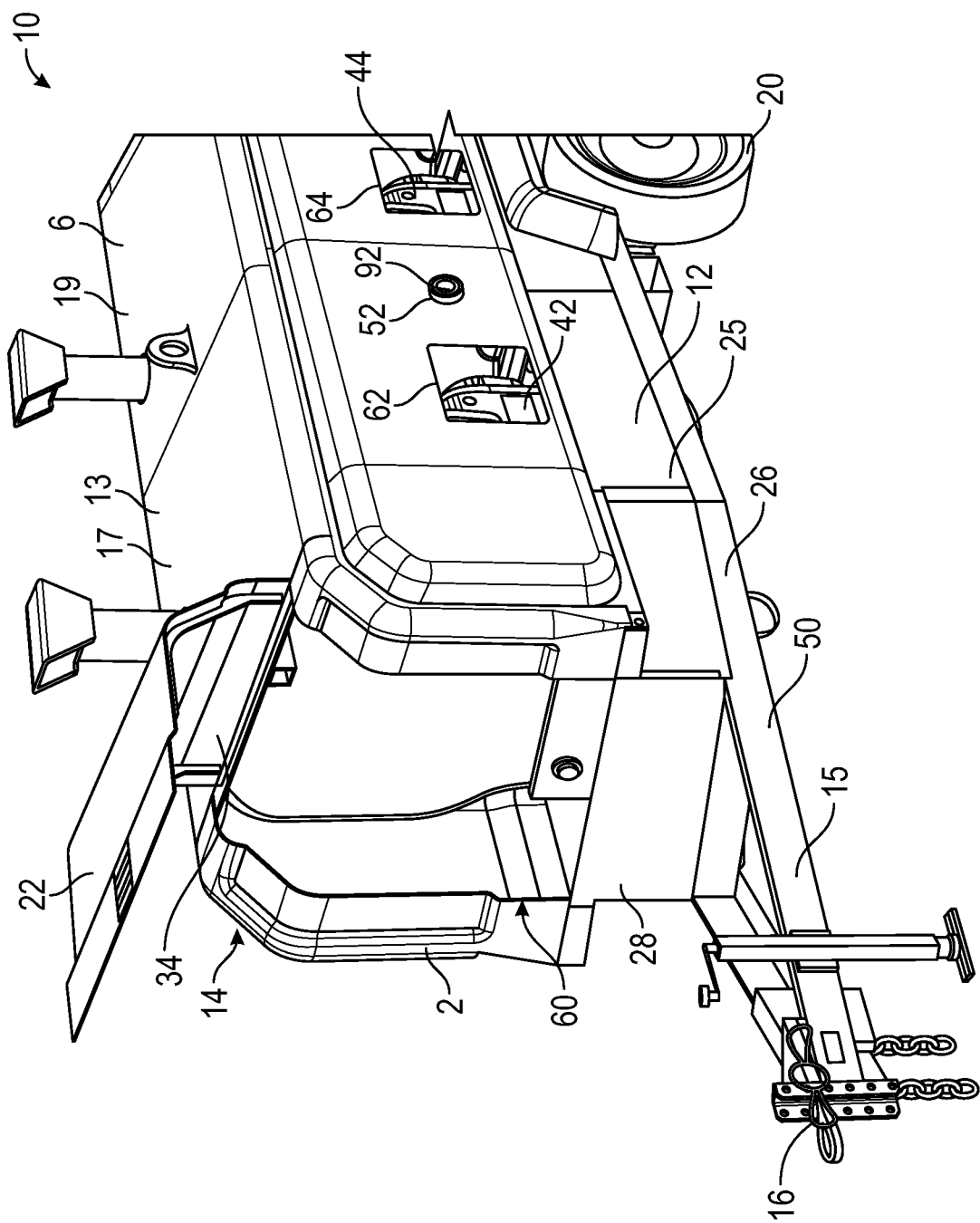
FIG. 5 is a front perspective view of the towable heater of FIG. 1.
Figure 6:
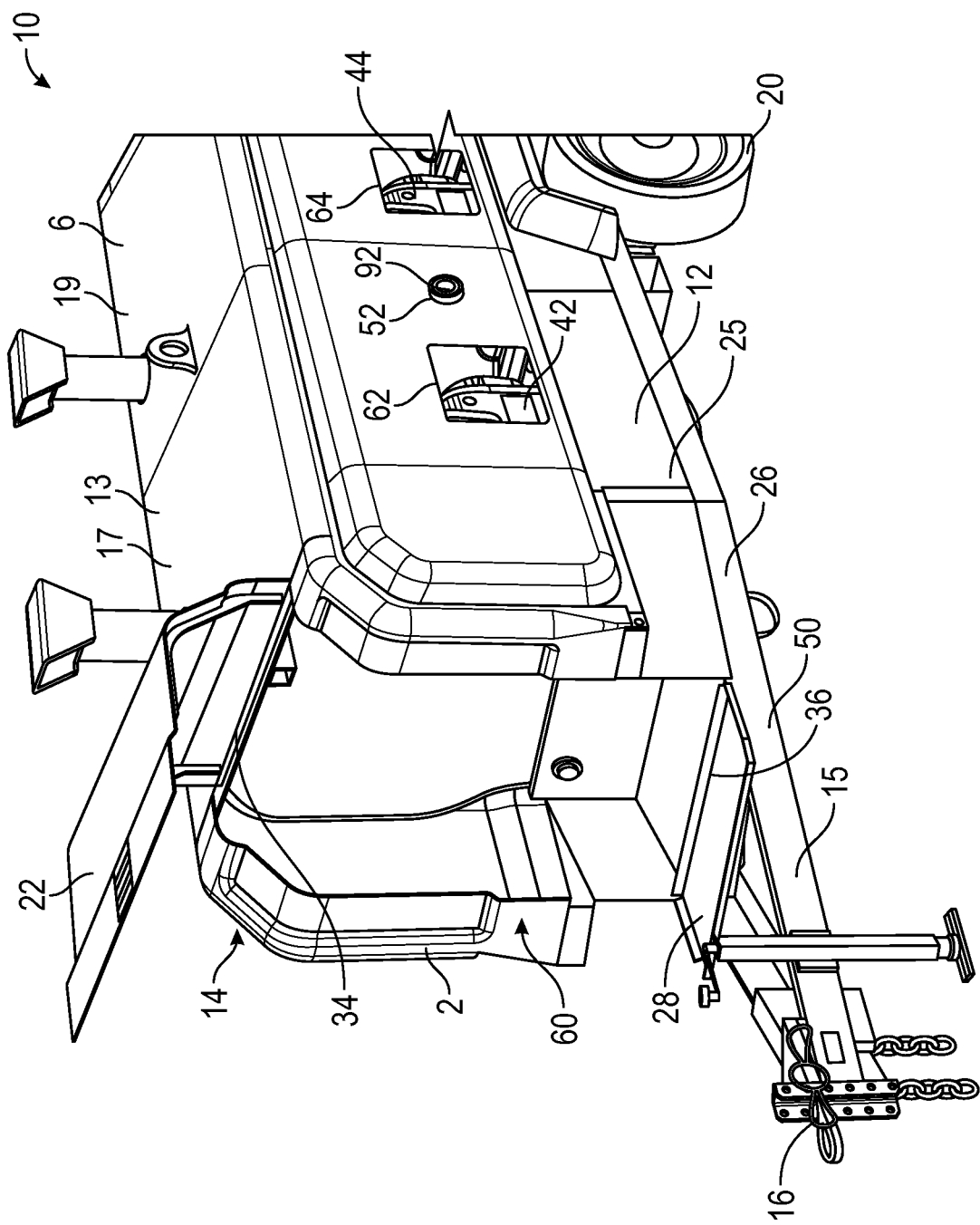
FIG. 6 is a front perspective view of the towable heater of FIG. 1.
Figure 7:
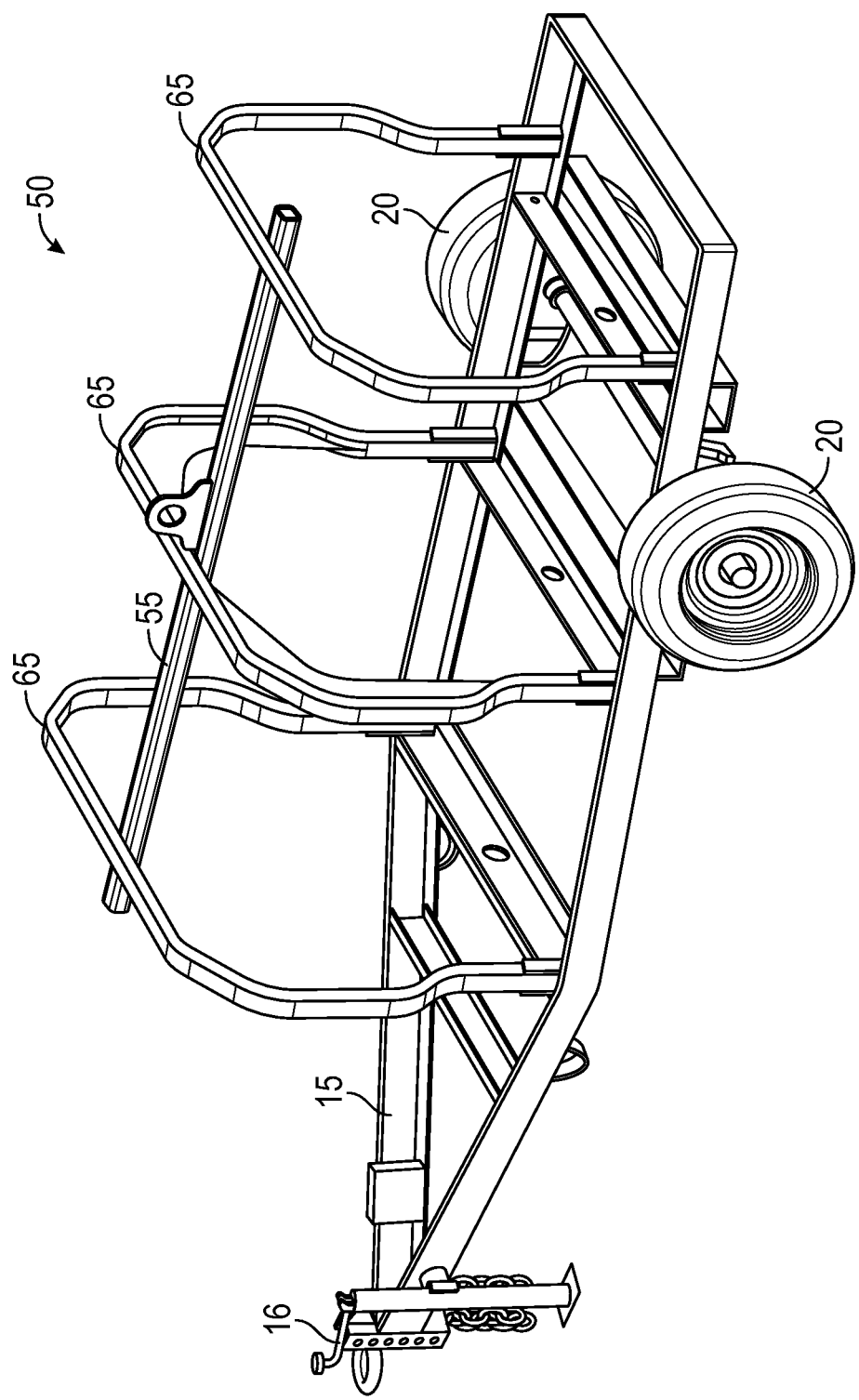
FIG. 7 is a rear perspective view of a trailer for use with the towable heater of FIG. 1, according to an exemplary embodiment.

Referring to FIGS. 5-6, a perspective view of the towable heater 10 with a front storage door 22 open is shown, according to an exemplary embodiment. The front storage door 22 is configured to open upward and outward from the housing 13, pivoting at hinge 34 (e.g., proximate the top 6 and first panel 17), exposing a front storage compartment 60. A front wall 28 of the front storage compartment 60 is configured to open outward and downward, pivoting at hinge 36 (e.g., proximate the bottom 8). In this way, there is more room to maneuver objects in and out of the compartment 60. For example, an operator can open the front storage door 22, then open the front wall 28 of the front storage compartment 60 such that it is not necessary to insert objects at an angle (e.g., diagonally) into the compartment 60. Instead, the operator can easily place items in and remove items from the compartment 60 without worrying about contacting the front wall 28. After placing ducts or other items into the compartment 60 and then closing the front wall 28, the operator can then place more items into the compartment 60 without worrying about the items falling out due to the positioning of the front wall 28. In addition, the operator can easily reach the bottom of the storage compartment 60 (e.g., to reach items fallen to the bottom of the compartment, clean the compartment, etc.).

Referring to FIGS. 7-11, a trailer 50 with a frame 15, a hitch 16, and one or more wheels 20 is shown, according to an exemplary embodiment. The frame 15 includes one or more divider supports 65 and a crossbar 55. The divider supports 65 and crossbar 55 help to support the panels (e.g., first panel 17, second panel 19), doors, and covers that make up the housing 13. One or more compartments are formed as part of the trailer 50.

Figure 11:
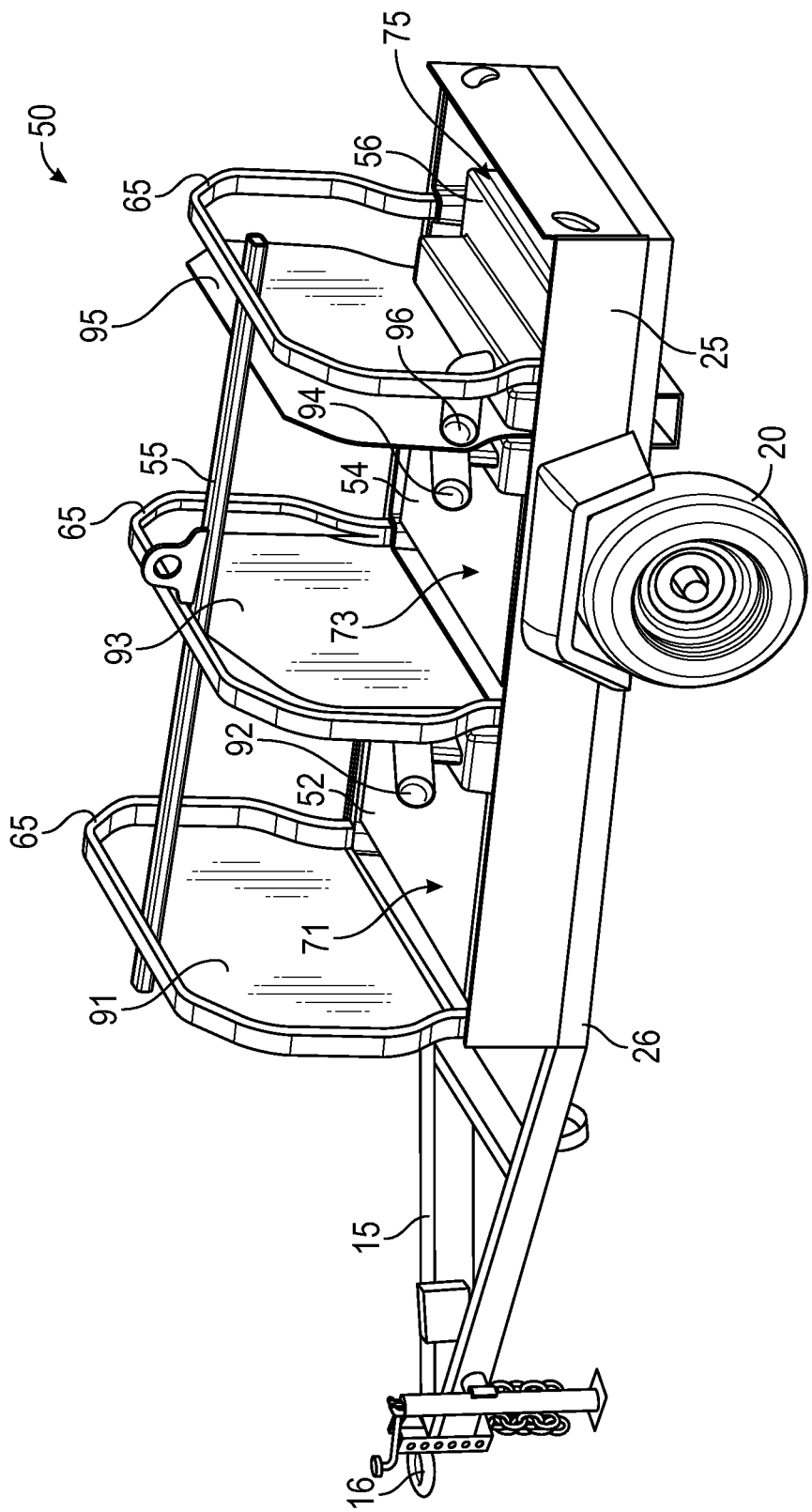
FIG. 11 is a rear perspective view of the trailer of FIG. 7.

One or more compartments or containment trays 71, 73, 75 are included. As shown in FIG. 11, the first compartment 71 is formed by the siding 25, a first wall 81, a first divider 91, a second wall 83, and a second divider 93. The second compartment 73 is formed by the siding 25, the second wall 83, the second divider 93, a third wall 85, and a third divider 95. The third compartment 75 is formed by the siding 25, the third wall 85, the third divider 95, and a fourth wall 87. Each burner 42, 44 is positioned within a separate compartment. For example, the first burner 42 is positioned in the first compartment 71 and the second burner 44 is positioned in the second compartment 73. In this way, each of the burners 42, 44 have recirculating capabilities, where air for a burner (e.g., first burner 42) is pulled only from a single compartment (e.g., first compartment 71). In addition, the air passing over the burners 42, 44 is combined with already-heated air passing through the compartments 71, 73. As such, the towable heater 10 does not have to work as hard to heat up the air flowing therethrough.

Figure 8:
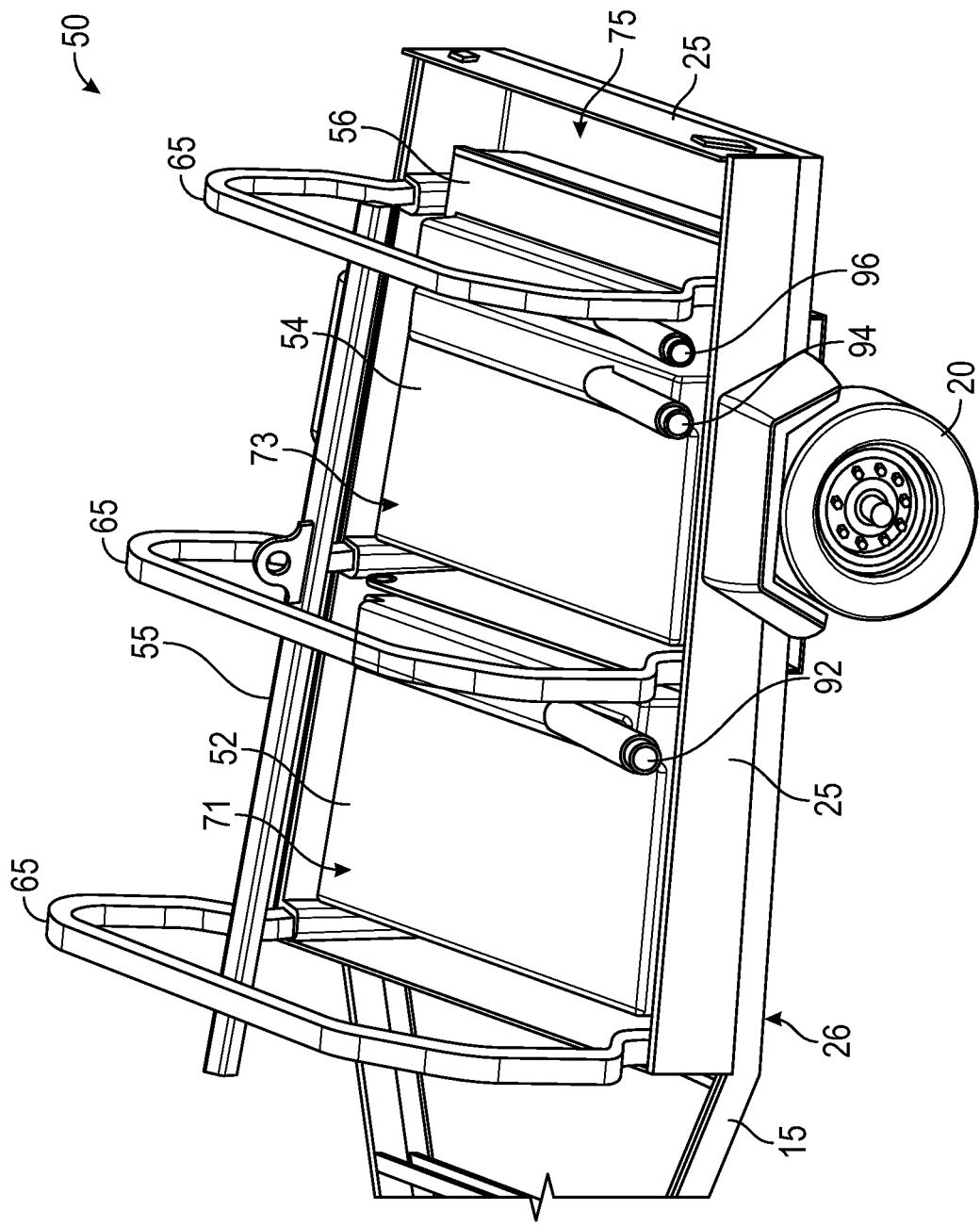
FIG. 8 is a perspective view of the trailer of FIG. 7 from the top.
Figure 9:
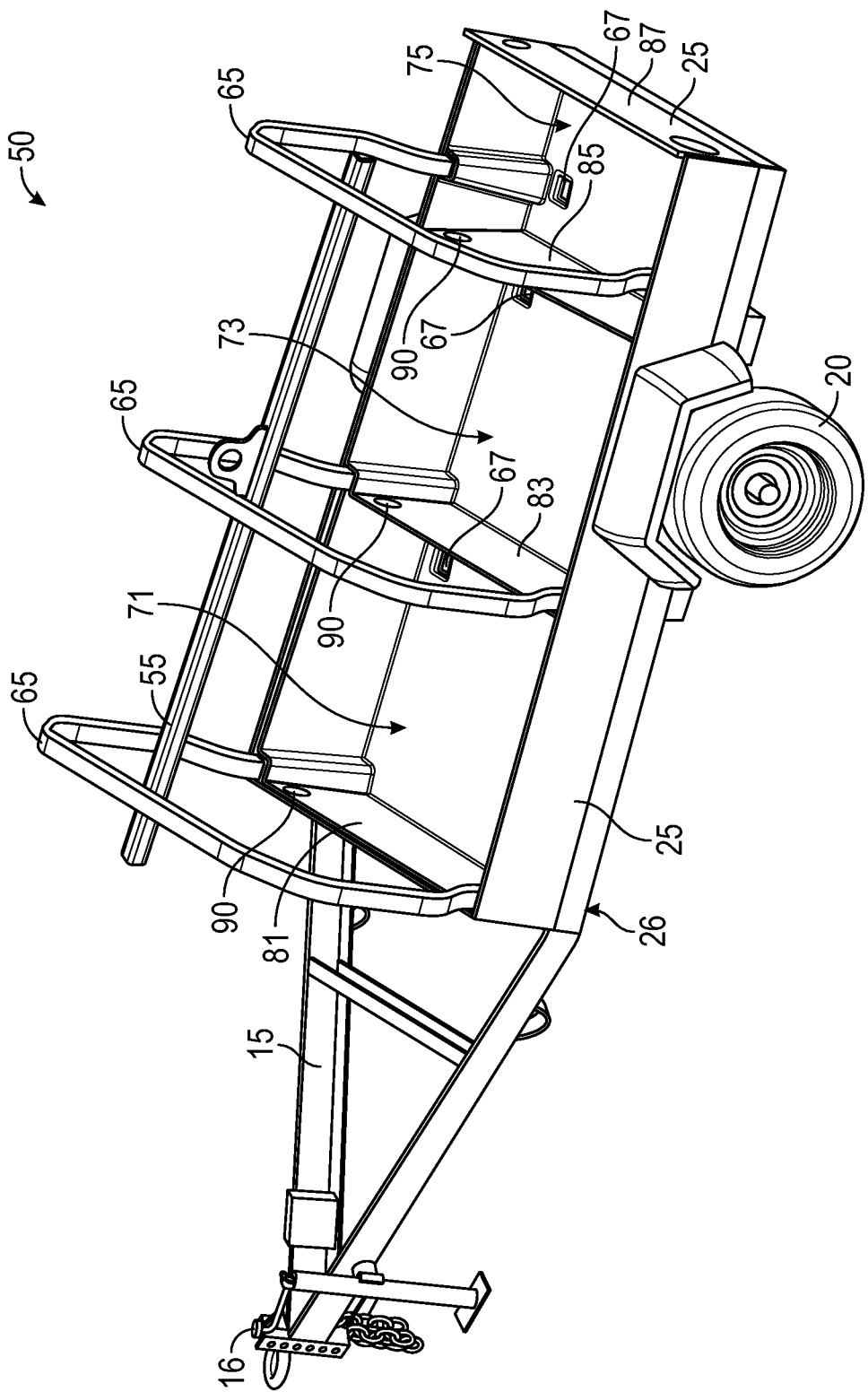
FIG. 9 is a perspective view of the trailer of FIG. 7.
Figure 10:
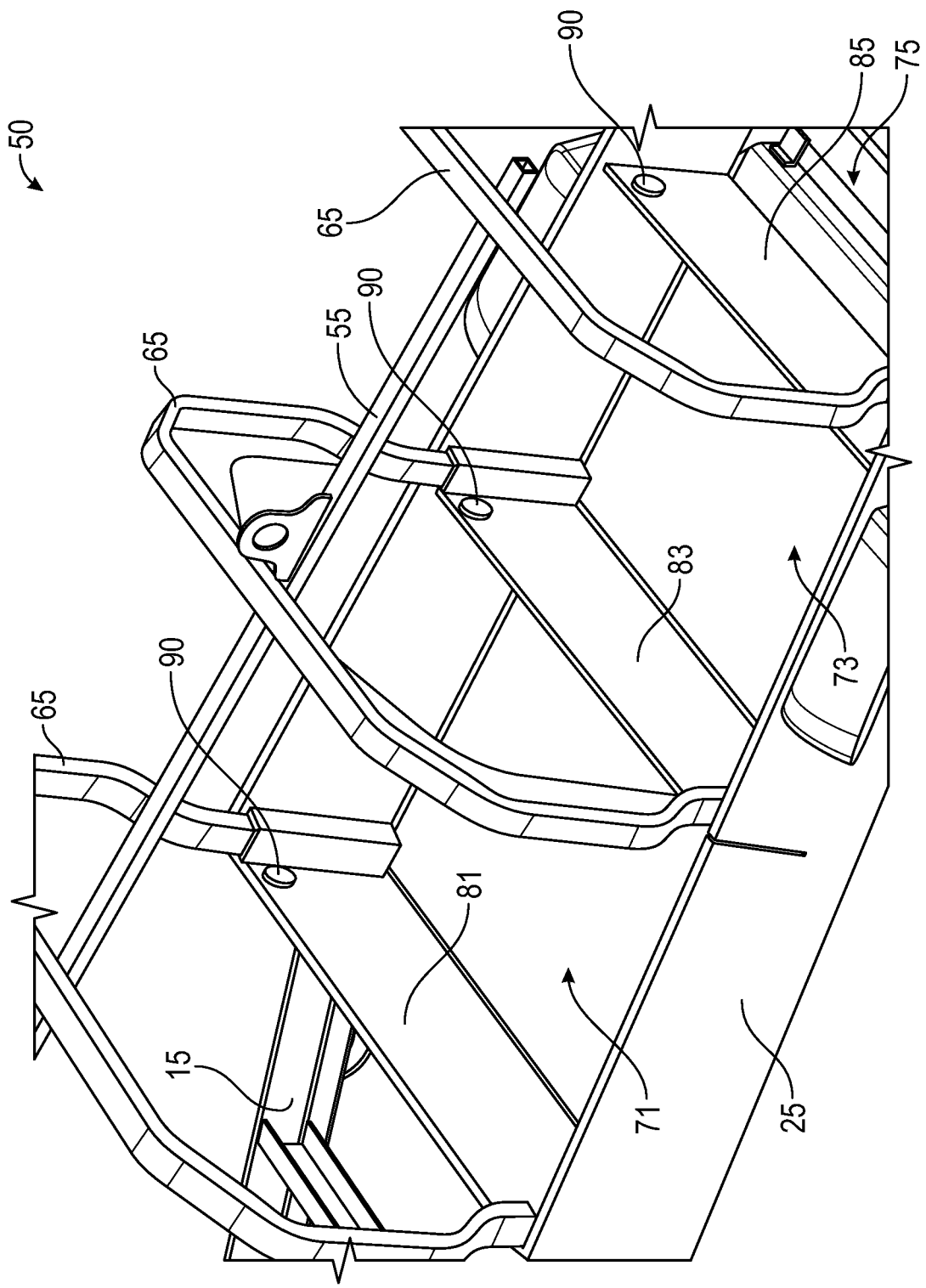
FIG. 10 is a perspective view of a portion of the trailer of FIG. 7.

As shown in FIG. 8, each of the fuel tanks 52, 54, 56 are positioned in a separate compartment. The first fuel tank 52 is positioned within the first compartment 71, the second fuel tank 54 is positioned within the second compartment 73, and the third fuel tank 56 is positioned within the third compartment 75. As shown in FIG. 10, one or more of the first wall 81, second wall 83, third wall 85, and fourth wall 87 include openings 90 such that each of the compartments are in fluid communication with each other. The openings 90 include a fuel line attachment feature inserted through the walls to connect the compartments. The compartments 71, 73, 75 each include a drain 67 for fluid to drain out of the compartment. The combination of these features allows the towable heater 10 to be parked on sloped or angled surfaces, where fluid can move between the compartments and not spill onto the ground. The compartments 71, 73, 75 provide 150% fluid containment.

The compartments are modular such that an operator can remove or add compartments to accommodate for the number of burners used with the towable heater 10. For example, if using a single burner (e.g., for a 500,000 BTU output), a manufacturer can remove a compartment (e.g., by removing a top panel and a side panel) and reduce the overall package size of the towable heater 10.

Figure 12:
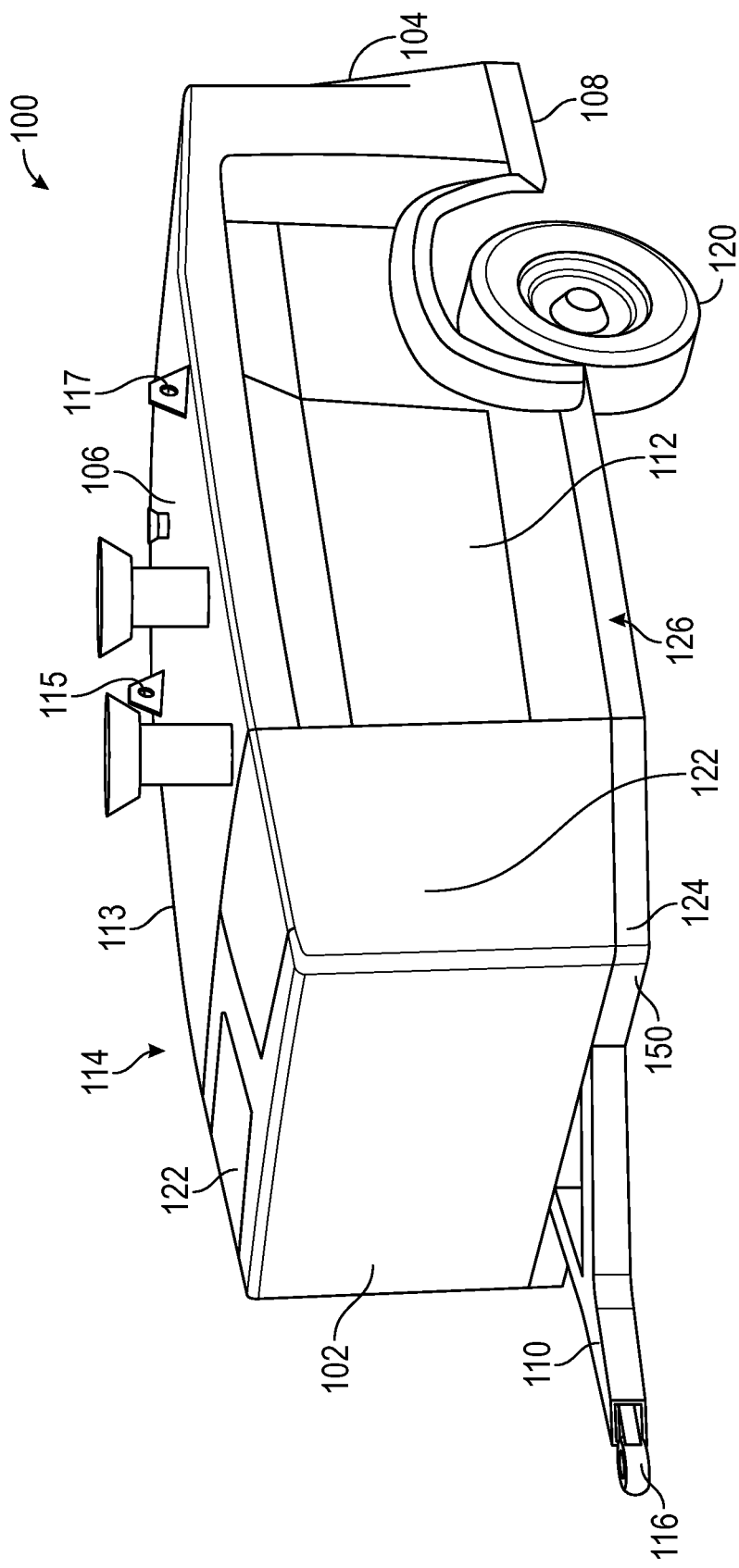
FIG. 12 is a front perspective view of a towable heater, according to an exemplary embodiment.
Figure 13:
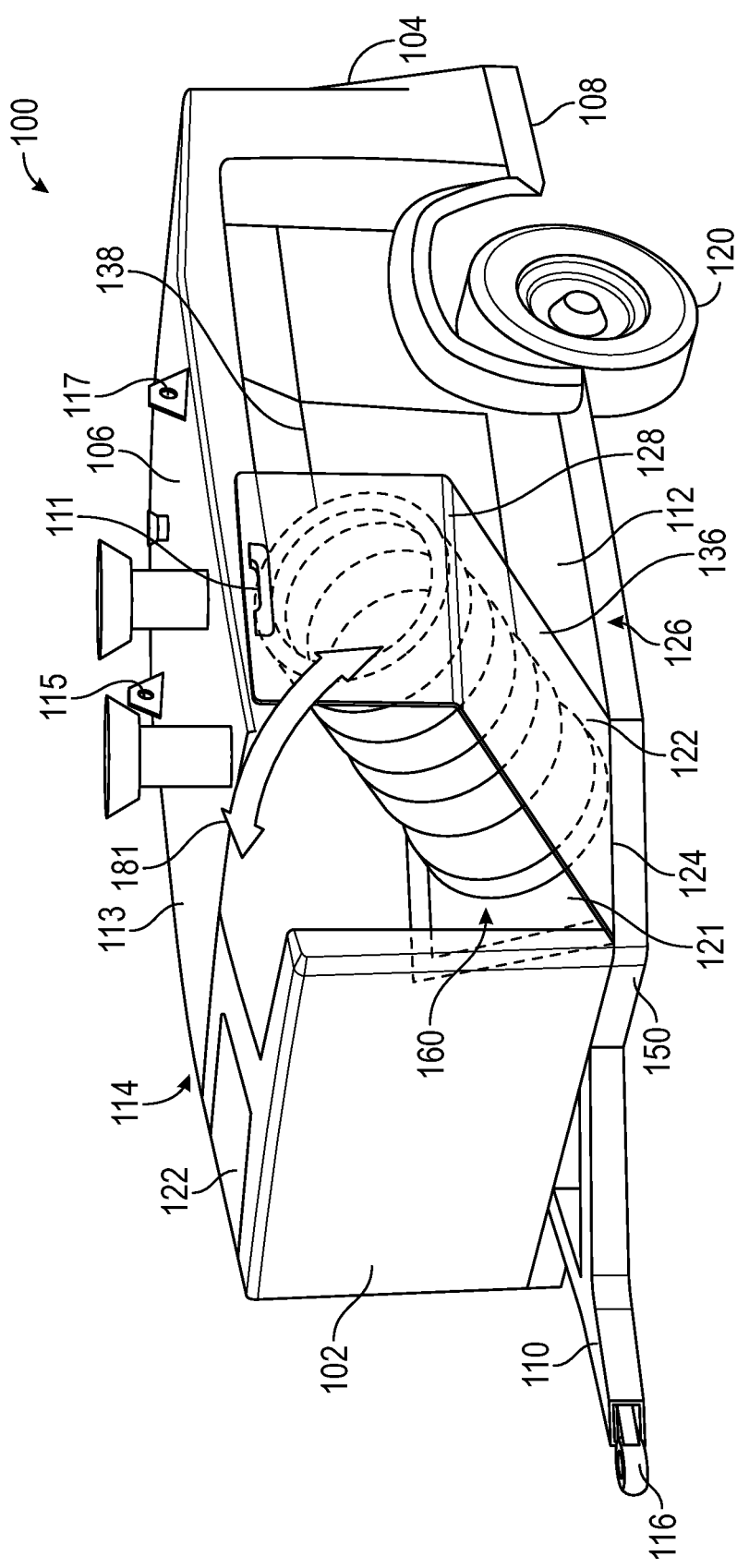
FIG. 13 is a front perspective view of the towable heater of FIG. 12.
Figure 14:
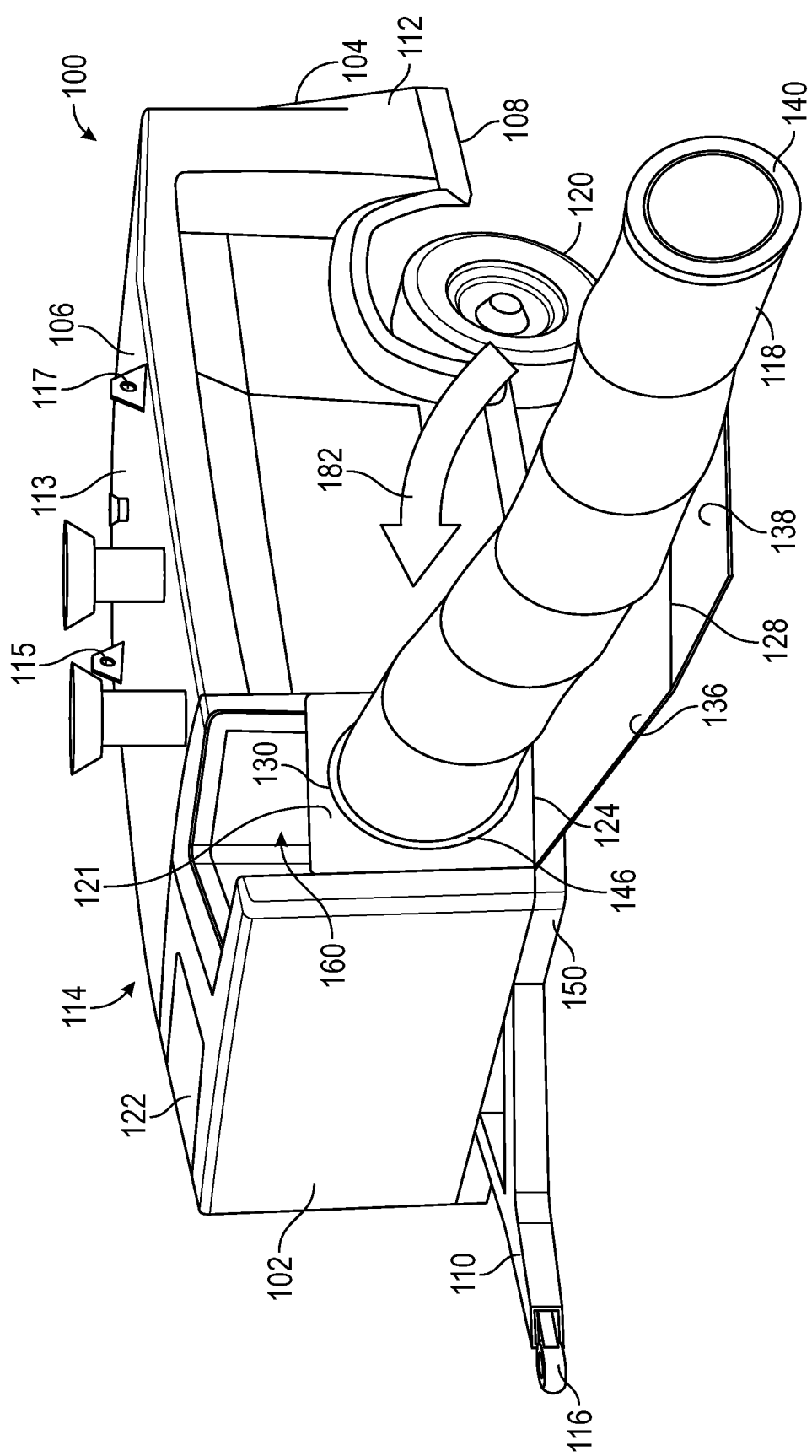
FIG. 14 is a front perspective view of the towable heater of FIG. 12.

Referring to FIGS. 12-14, a towable heater 100 is shown, according to an exemplary embodiment. The towable heater 100 includes a housing 113 including a front 102, rear 104, top 106, bottom 108, left side 112, and right side 114. In various embodiments, the housing 113 may be made up at least partially of panels, dividers, covers, and doors as will be described further herein (e.g., storage doors 122). The housing 113 also includes a fluid containment system 126 including various trays, compartments, panels, and portions, as described further herein. The housing 113 houses the generator and the burners, as well as various other stored items. The towable heater 100 is mounted on and supported by a trailer 150 with a frame 110, a hitch 116, and one or more wheels 120 for portability. In some embodiments, a portion of the trailer 150 or frame 110 forms a portion of the housing 113. The housing 113 includes at least two lift points 115, 117, which can be used to lift the heater 100 off of the trailer 150. Using the two lift points 115, 117, the heater 100 can be removed from the trailer 150 in a balanced fashion.

Referring to FIG. 13, a perspective view of the towable heater 100 with a side storage door 122 partially open is shown, according to an exemplary embodiment. The towable heater 100 includes one or more side storage doors 122 configured to open outward from the left and right sides 112, 114, pivoting at hinge 124 (e.g., proximate the bottom 108), providing access to two side storage compartments 160. For example, arrow 181 illustrates the movement of side storage door 122. The side storage compartments 160 and doors 122 are positioned proximate the front 102 of the towable heater 100. The side storage compartment 160 is formed by a bottom wall 121, a side wall 136, and a top wall 138. The top wall 138 pivots at hinge 128 relative to side wall 136 and the side wall 136 pivots at hinge 124 relative to bottom wall 121. To open the side storage door 122, an operator can grab onto a handle 111 on the top wall 138 and pull outward away from the center of the towable heater 100 and downward toward the ground. The side storage compartment 160 may store a duct 118. As shown in FIG. 14, the side storage door 122 can extend out into a ramp that supports the duct 118. The inclusion of the ramp limits the possibility of the duct 118 kinking. The duct 118 extends from a first end 130 to a second end 140. The first end 130 is configured to couple to the towable heater 100 at connection 146 (e.g., formed at bottom wall 121) and the duct 118 extends along the ramp to the second end 140. To position the duct 118 back in the housing 113, an operator can push the second end 140 of the duct 118 toward the first end 130 (e.g., condensing the duct 118) and simultaneously lift up the top wall 138 and side wall 136, effectively pivoting the side storage door 122 at hinge 128 and back into the housing 113.

Figure 15:
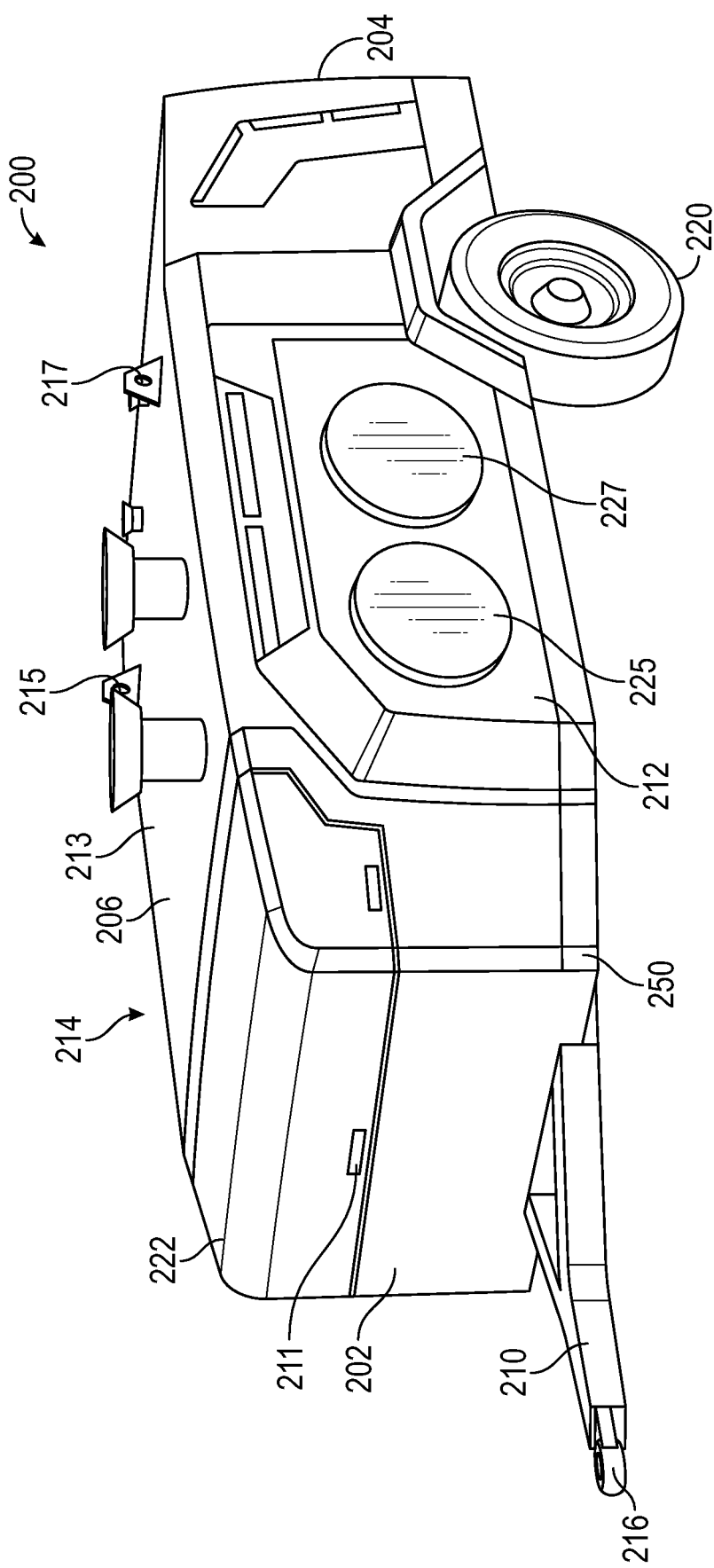
FIG. 15 is a front perspective view of a towable heater, according to an exemplary embodiment.
Figure 16:
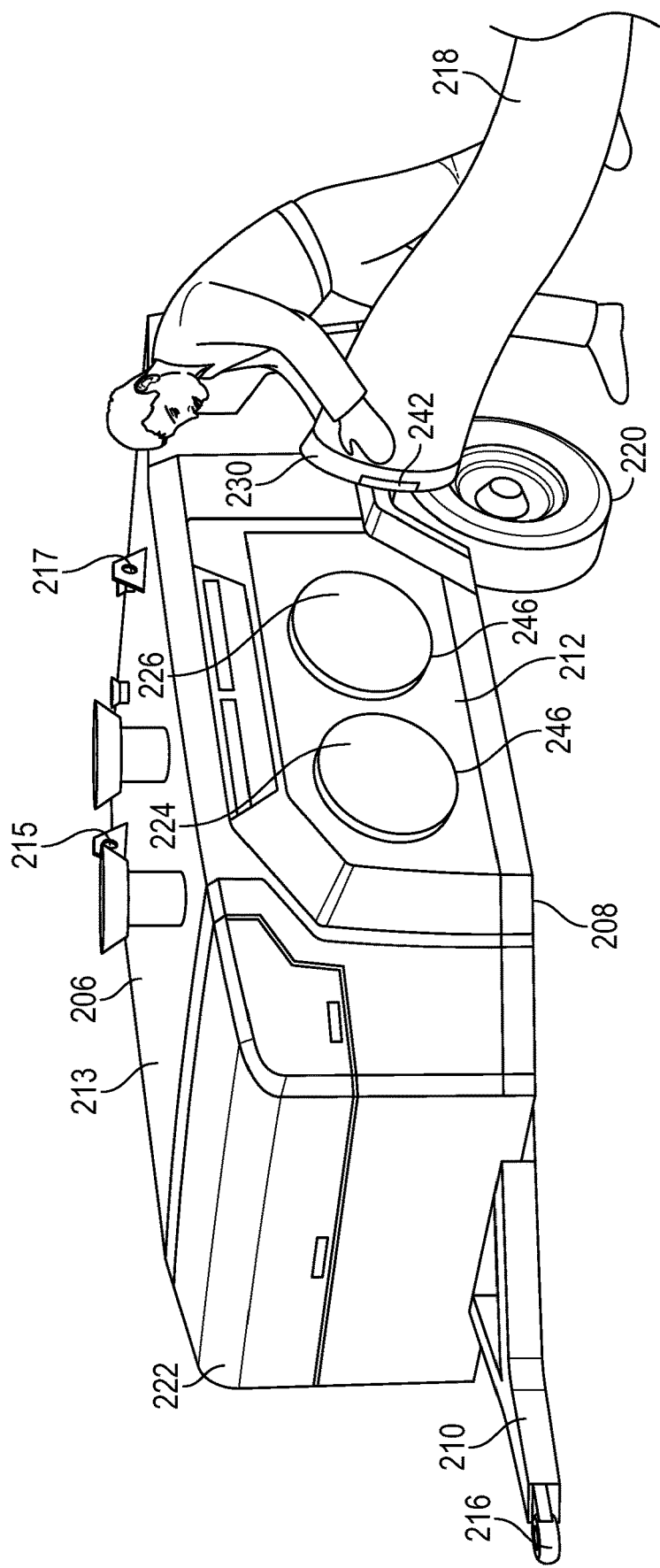
FIG. 16 is a front perspective view of the towable heater of FIG. 15.

Referring to FIGS. 15-16, a towable heater 200 is shown, according to an exemplary embodiment. The towable heater 200 includes a housing 213 including a front 202, rear 204, top 206, bottom 208, left side 212, and right side 214. The housing 213 houses the generator and the burners, as well as various other stored items. The towable heater 200 is mounted on and supported by a trailer 250 with a frame 210, a hitch 216, and one or more wheels 220 for portability. The towable heater 200 includes a storage door 222 configured to open to provide access to a storage compartment. To open the side storage door 222, an operator can grab onto a handle 211 and pull outward away from the center of the towable heater 100 and upward away from the ground. The storage door 222 is formed as part of the front 202. The storage door 222 is aerodynamic, rigid, and lightweight. In some embodiments, the storage door 222 is rotomolded. The housing 213 includes at least two lift points 215, 217, which can be used to lift the heater 200 off of the trailer 250. Using the two lift points 215, 217, the heater 200 can be removed from the trailer 250 in a balanced fashion.

Figure 17:
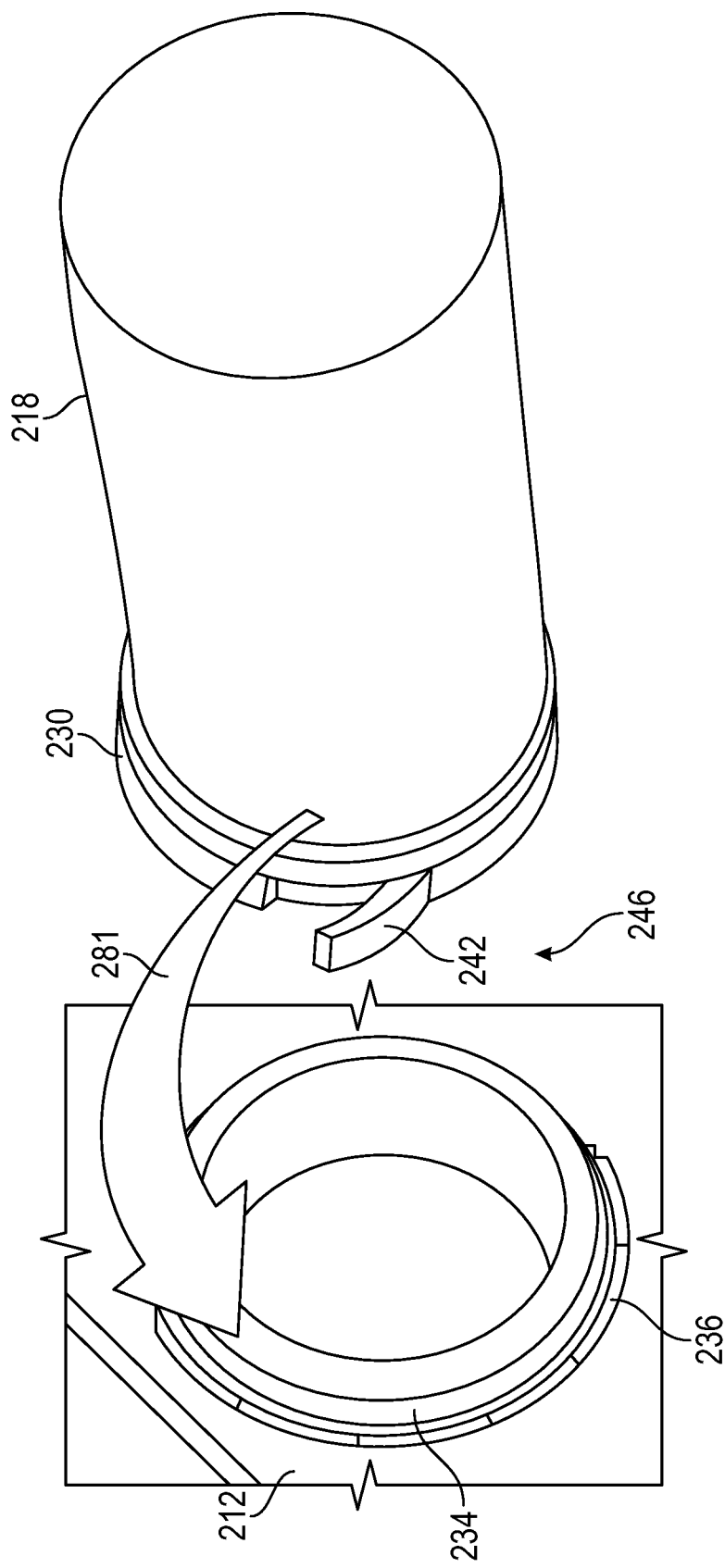
FIG. 17 is a perspective schematic view of a connection feature of the towable heater of FIG. 15.
Figure 18:
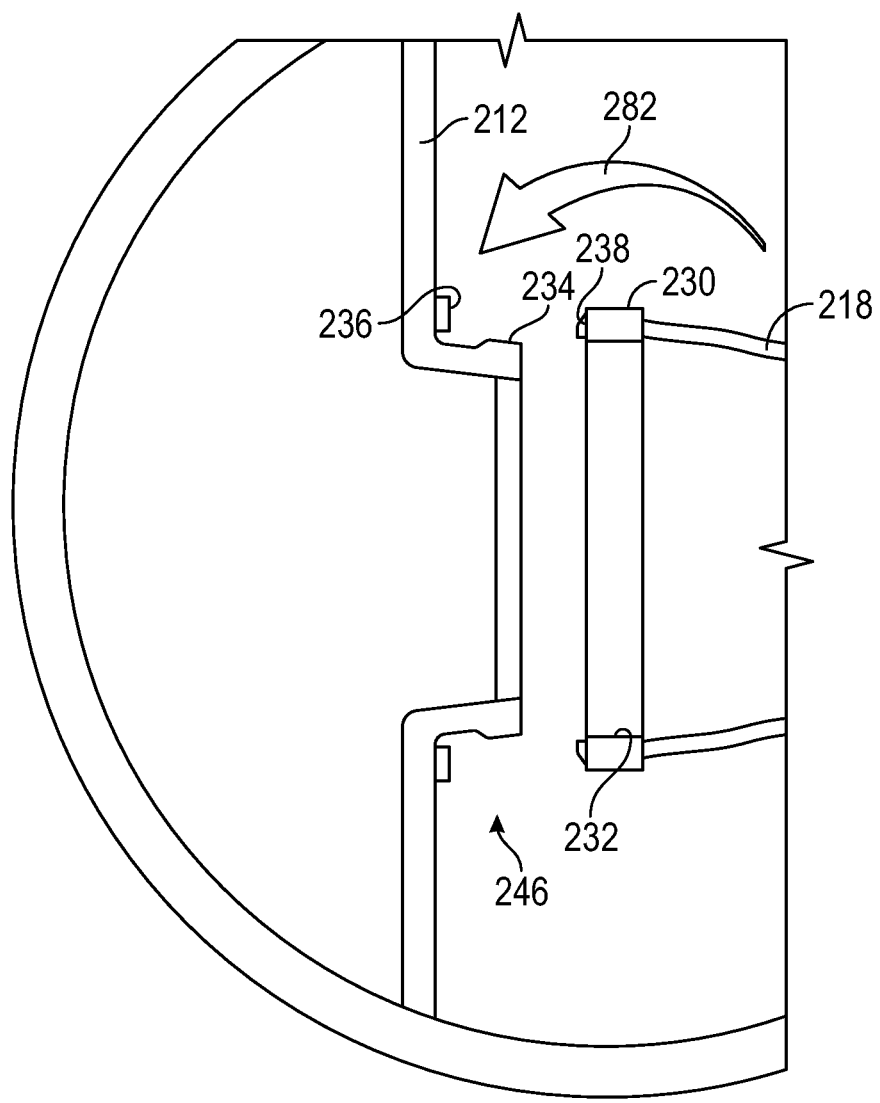
FIG. 18 is a side schematic view of the connection feature of FIG. 17.

The towable heater 200 includes a first outlet 224 and a second outlet 226 configured to expel heated air from the towable heater 200. As shown in FIG. 15, the first outlet 224 may be enclosed by a first outlet cover 225 and the second outlet 226 may be enclosed by a second outlet cover 227. By using separate outlet covers 225, 227, a door or panel is not necessary, thereby reducing the complexity of the housing 213 design. Referring to FIGS. 16-18, a duct 218 is removably coupled to the towable heater 200 at either the first outlet 224 or the second outlet 226. The duct 218 includes an inlet end 230 configured to be coupled to the towable heater 200 via connection feature 246. The duct 218 is coupled to one of the outlets 224, 226 by sliding the inner diameter 232 of the duct 218 over the outer diameter 234 of the outlet 224, 226, shown by arrow 281 in FIG. 17. A magnet 238 (e.g., a magnetic ring) on the duct 218 couples either directly to the side 212 of the towable heater 10 (e.g., made of a ferromagnetic material) or to a magnet 236 (e.g., a magnetic ring) on the side 212 of the towable heater 200. In some embodiments, the duct 218 includes a clamp 242 at the inlet end 230. Using the connection feature 246 (e.g., magnets 236, 238, side 212), an operator can easily connect and disconnect a duct 218 without the use of tools by sliding the duct 218 over one of the outlets 224, 226. As illustrated in FIG. 18, the duct 218 can be moved towards and coupled to connection feature 246. In some embodiments, the magnet 238 used on the duct 218 can be part of a magnetic attachment to the duct 218 and not formed as a part of the duct 218. Accordingly, the magnetic attachment can be purchased separately and used with the duct 218 and the duct 218 does not need to be modified in any way.

Figure 19:
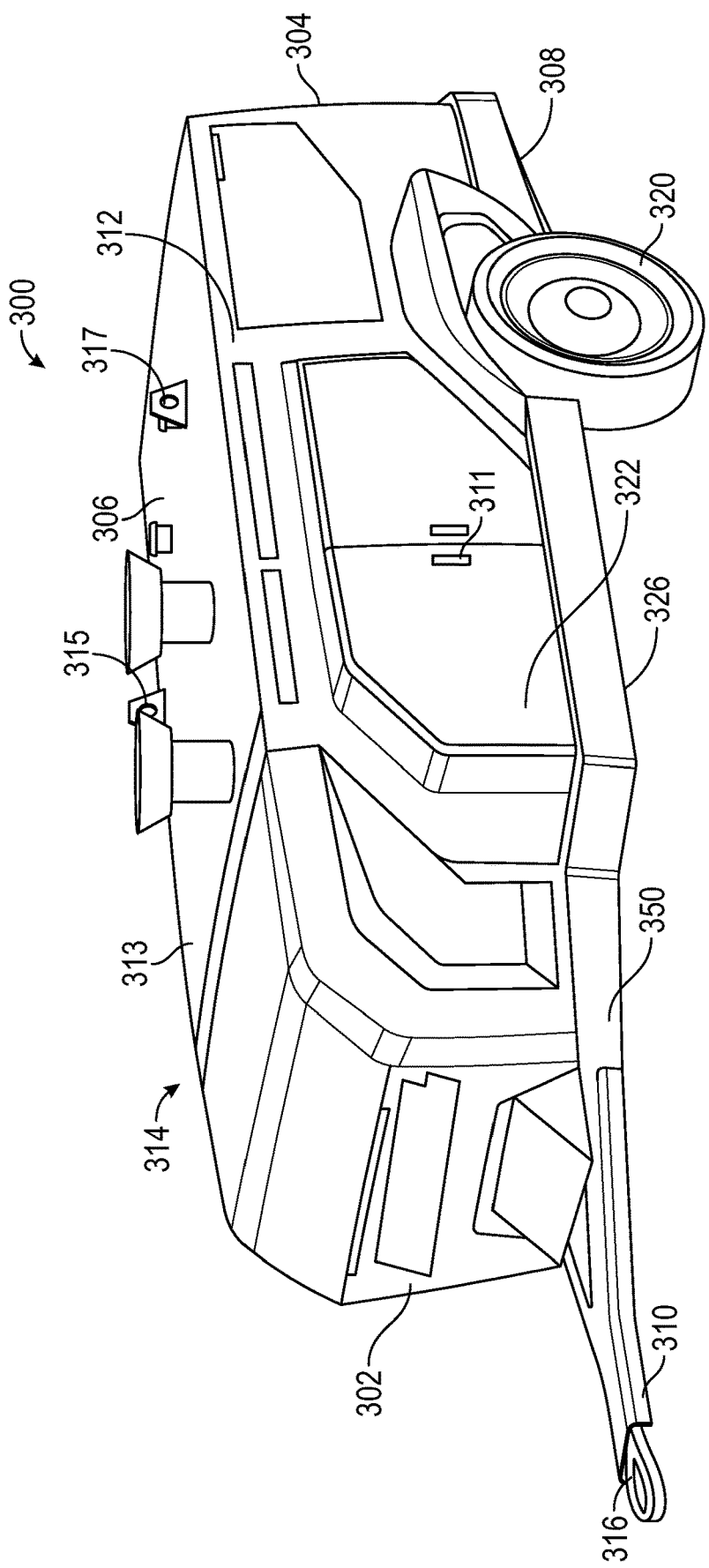
FIG. 19 is a front perspective view of a towable heater, according to an exemplary embodiment.
Figure 20:
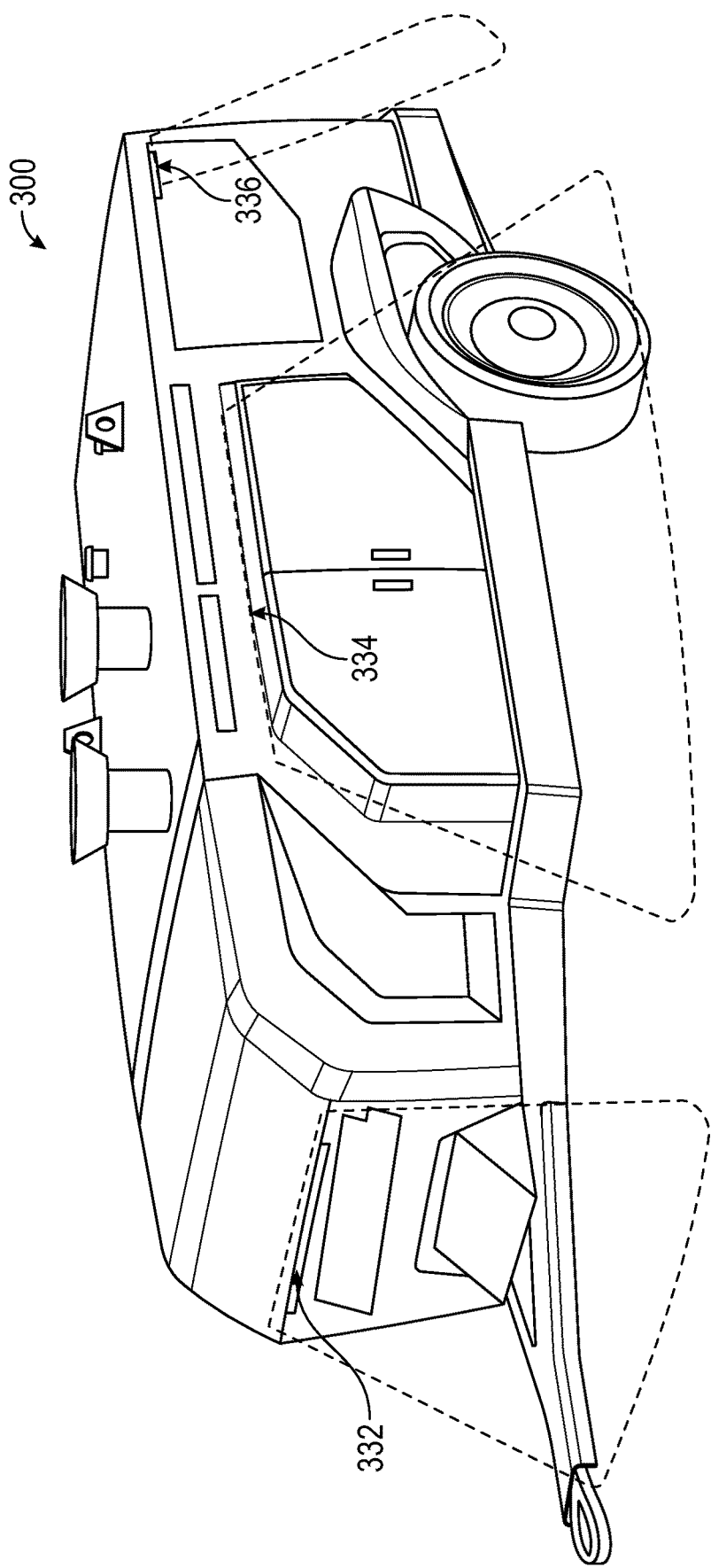
FIG. 20 is a front perspective view of the towable heater of FIG. 19.

Referring to FIGS. 19-20, a towable heater 300 is shown, according to an exemplary embodiment. The towable heater 300 includes a housing 313 including a front 302, rear 304, top 306, bottom 308, left side 312, and right side 314. The housing 313 houses the generator and the burners, as well as various other stored items. The housing 313 also includes a fluid containment system 326 including various trays, compartments, panels, and portions, as described further herein. The towable heater 300 is mounted on and supported by a trailer 350 with a frame 310, a hitch 316, and one or more wheels 320 for portability. The towable heater 300 includes a storage door 322 configured to open to provide access to a storage compartment. The storage door 322 is formed as part of the left side 312. To open the side storage door 322, an operator can grab onto a handle 311 and pull outward away from the center of the towable heater 300. In some embodiments, the towable heater 300 has a plurality of doors 322. The housing 313 includes at least two lift points 315, 317, which can be used to lift the heater 300 off the trailer 350. Using the two lift points 315, 317, the heater 300 can be removed from the trailer 350 in a balanced fashion. The towable heater 300 also includes one or more lights 332, 334, 336. A first light 332 is positioned on the front 302, a second light 334 is positioned on the side (e.g., left side 312, right side 314), and a third light 336 is positioned on the rear 304. The lights 332, 334, 336 may be ambient-light sensors such that as it gets dark outside the lights turn on, or motion-sensors or proximity sensing lights such that as an operator approaches or walks by the towable heater 300, the lights turn on. The lights provide 360 degree lighting surround the towable heater 300.

Figure 21:
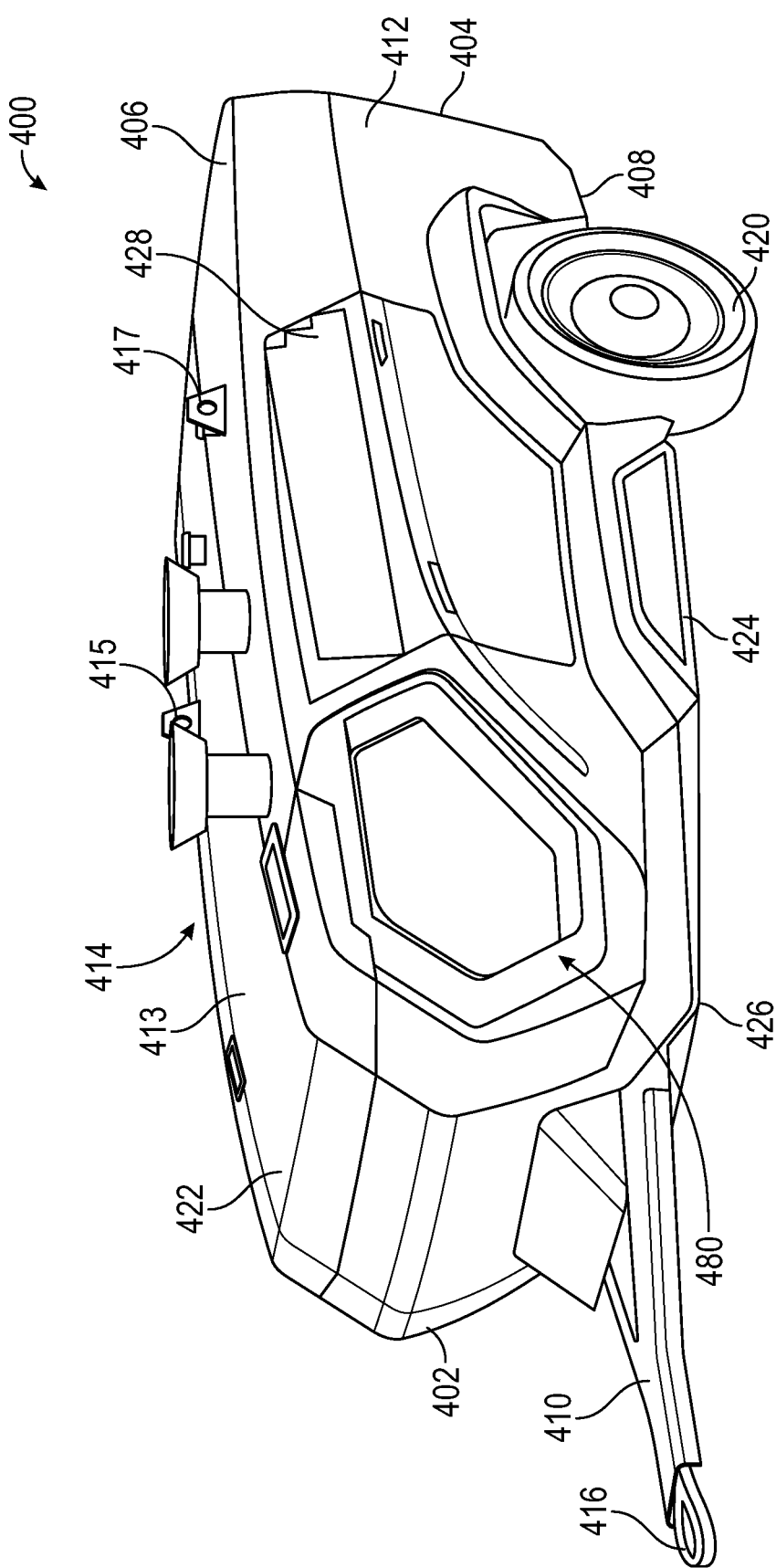
FIG. 21 is a front perspective view of a towable heater, according to an exemplary embodiment.
Figure 22:
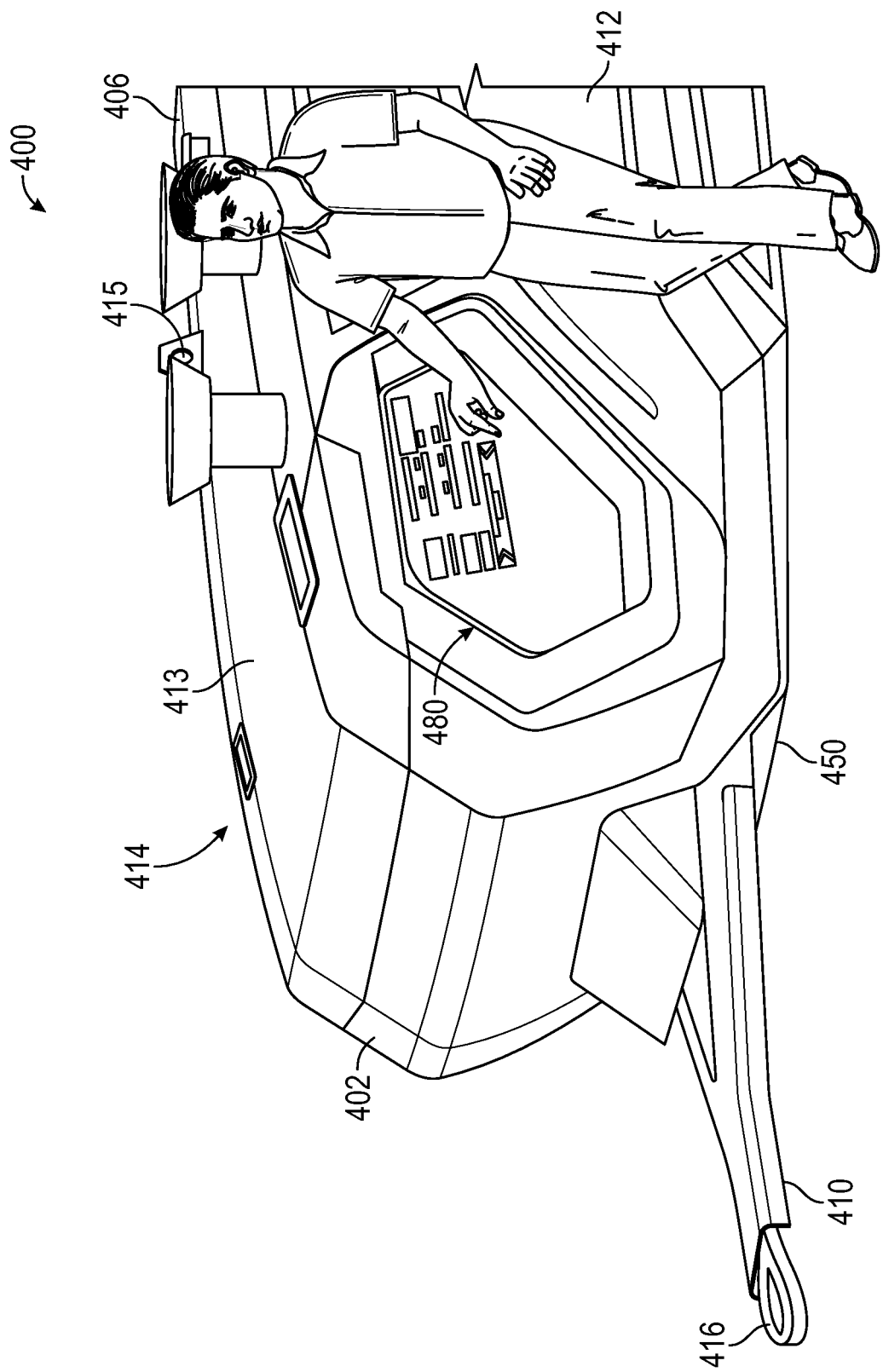
FIG. 22 is a front perspective view of the towable heater of FIG. 21.
Figure 23:
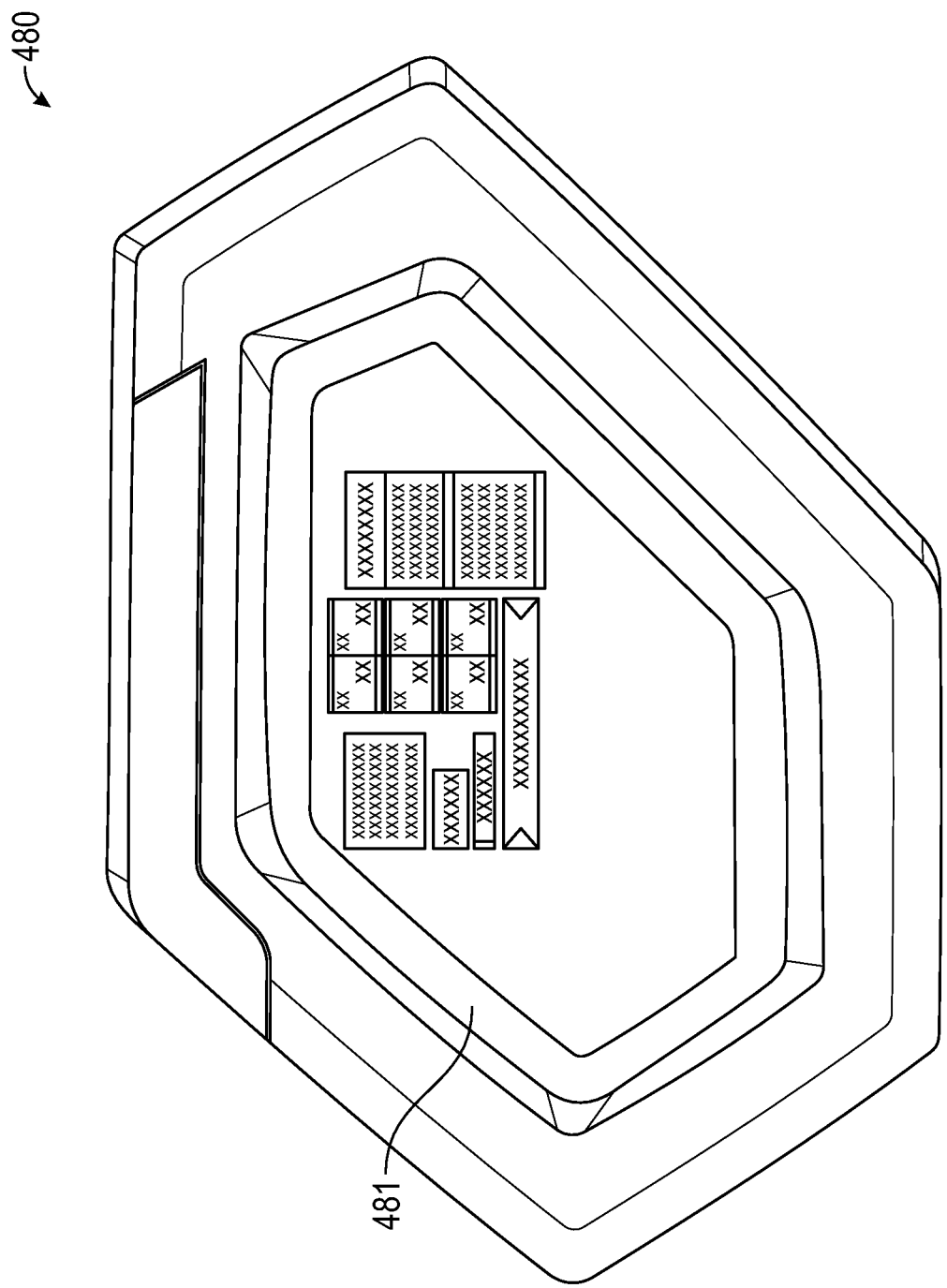
FIG. 23 is a front view of a user interface of the towable heater of FIG. 21.
Figure 24:
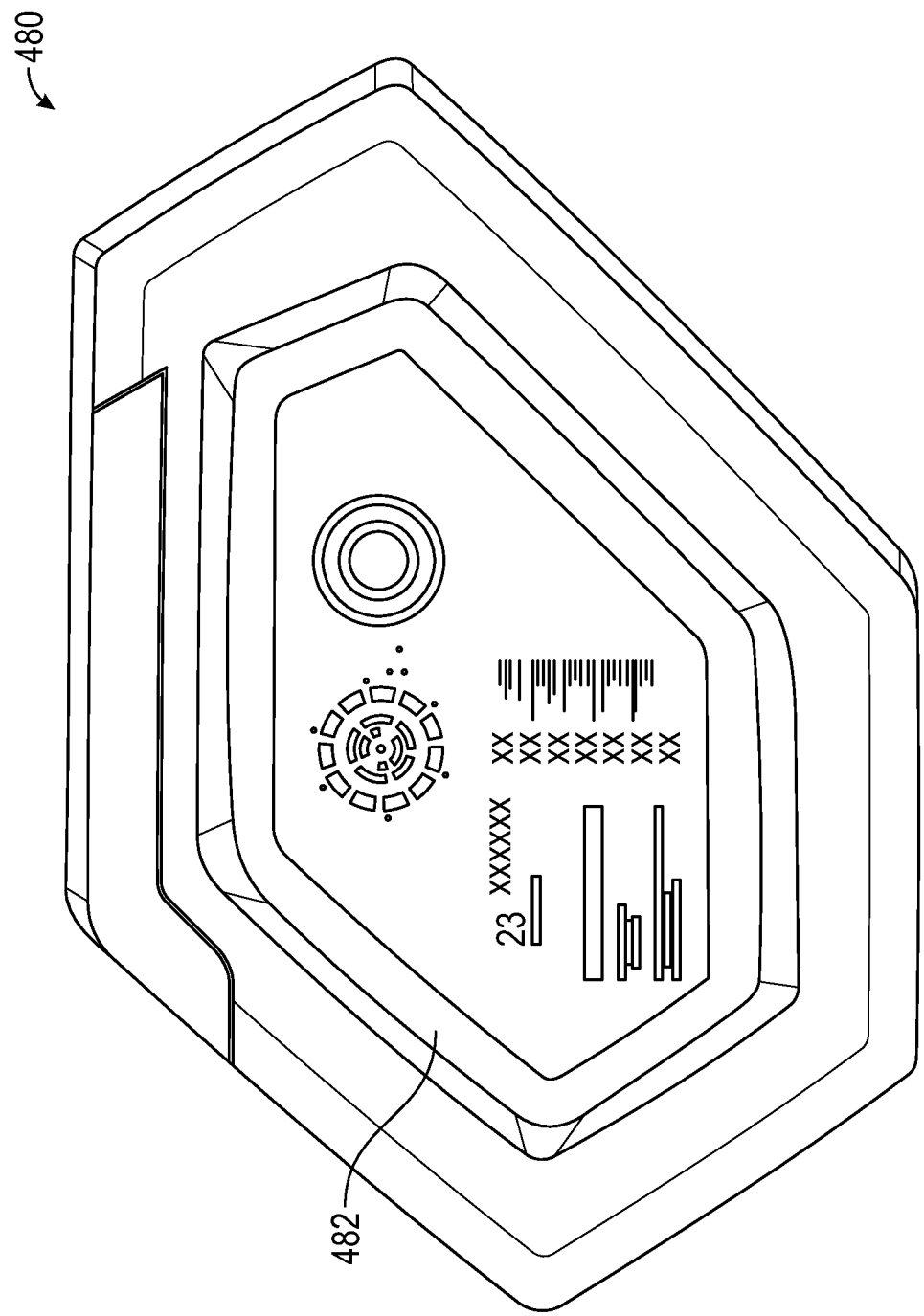
FIG. 24 is a front view of a user interface of the towable heater of FIG. 21.

Referring to FIGS. 21-22, a towable heater 400 is shown, according to an exemplary embodiment. The towable heater 400 includes a housing 413 including a front 402, rear 404, top 406, bottom 408, left side 412, and right side 414. The housing 413 houses the generator and the burners, as well as various other stored items. The housing 413 also includes a fluid containment system 426 including various trays, compartments, panels, and portions, as described further herein. The towable heater 400 is mounted on and supported by a trailer 450 with a frame 410, a hitch 416, and one or more wheels 420 for portability. The towable heater 400 includes a front storage door 422 configured to open to provide access to a front storage compartment. The storage door 422 may be formed as part of the front 402. The towable heater 400 also includes a user interface 480. The housing 413 includes at least two lift points 415, 417, which can be used to lift the heater 400 off of the trailer 450. Using the two lift points 415, 417, the heater 400 can be removed from the trailer 450 in a balanced fashion. The user interface 480 displays information regarding the performance and status of the towable heater 400. In effect, the user interface 480 provides a single point of control for an operator of the towable heater 400. An operator can interact with the user interface 480 by touching a screen, using a separate mobile device, etc. The operator can view the operating status of the towable heater 400 such as operating temperatures, burner output, generator output, operating pressures, engine speed, fuel levels, etc. In addition, the operator can input controls into the user interface 480 to control the operation of the generator and burners. Referring to FIGS. 23-24, example user interfaces 480 are shown. In some embodiments, the color of the user interfaces 480 can indicate the status of the towable heater 400. For example, in FIG. 23, the user interface 480 is displayed in a first color 481, for example red, and may indicate there are one or more warnings about the operation of the towable heater 400. In FIG. 24, the user interface 480 is displayed in a second color 482, for example green, and may indicate that the towable heater 400 is operating in a normal manner. In some embodiments, the first color 481 or the second color 482 may be visible to an operator from a distance, and the color can indicate the status of the towable heater 400.

In some embodiments, the towable heater includes a controller. The controller is configured to control operation of the generator, burners, and other components of the towable heater remotely. For example, the controller can control up to 30 different burners to which it is connected. In some embodiments, the controller can control the provision of power from the generator to the one or more burners. In this way, the controller can optimize the use of the one or more burners based on a user-desired and/or system-determined input. The controller is thus operatively and communicably coupled to the generator, the one or more burners, and the user interface (e.g., user interface 480).

In some embodiments, the controller communicates with a separate user/operator device via a WiFi connection. As shown, the controller includes a processing circuit, which may include a processor and a memory. The processor may be implemented as a general-purpose processor, an application specific integrated circuit (ASIC), one or more field programmable gate arrays (FPGAs), a digital signal processor (DSP), a group of processing components that may be distributed over various geographic locations or housed in a single location, or other suitable electronic processing components. The one or more memory devices (e.g., RAM, NVRAM, ROM, Flash Memory, hard disk storage) may store data and/or computer code for facilitating the various processes described herein. Moreover, the one or more memory devices may be or include tangible, non-transient volatile memory or non-volatile memory. Accordingly, the one or more memory devices may include database components, object code components, script components, or any other type of information structure for supporting the various activities and information structures described herein.

In some embodiments, the user interface 480 is controlled by the controller (e.g., an input/output circuit of the controller) structured to receive and provide communication(s) to an operator of the towable heater 400. In this regard, the controller is structured to exchange data, communications, instructions, etc. with an input/output component of the user interface 480. Accordingly, in one embodiment, the controller includes an input/output device such as a display device, a touchscreen, a keyboard, a microphone, etc. In another embodiment, the controller may include communication circuitry for facilitating the exchange of data, values, messages, and the like between an input/output device and the components of the user interface 480. In yet another embodiment, the controller may include machine-readable media for facilitating the exchange of information between the input/output device and the components of the user interface 480. In still another embodiment, the controller may include any combination of hardware components (e.g., a touchscreen), communication circuitry, and machine-readable media.

Figure 25:
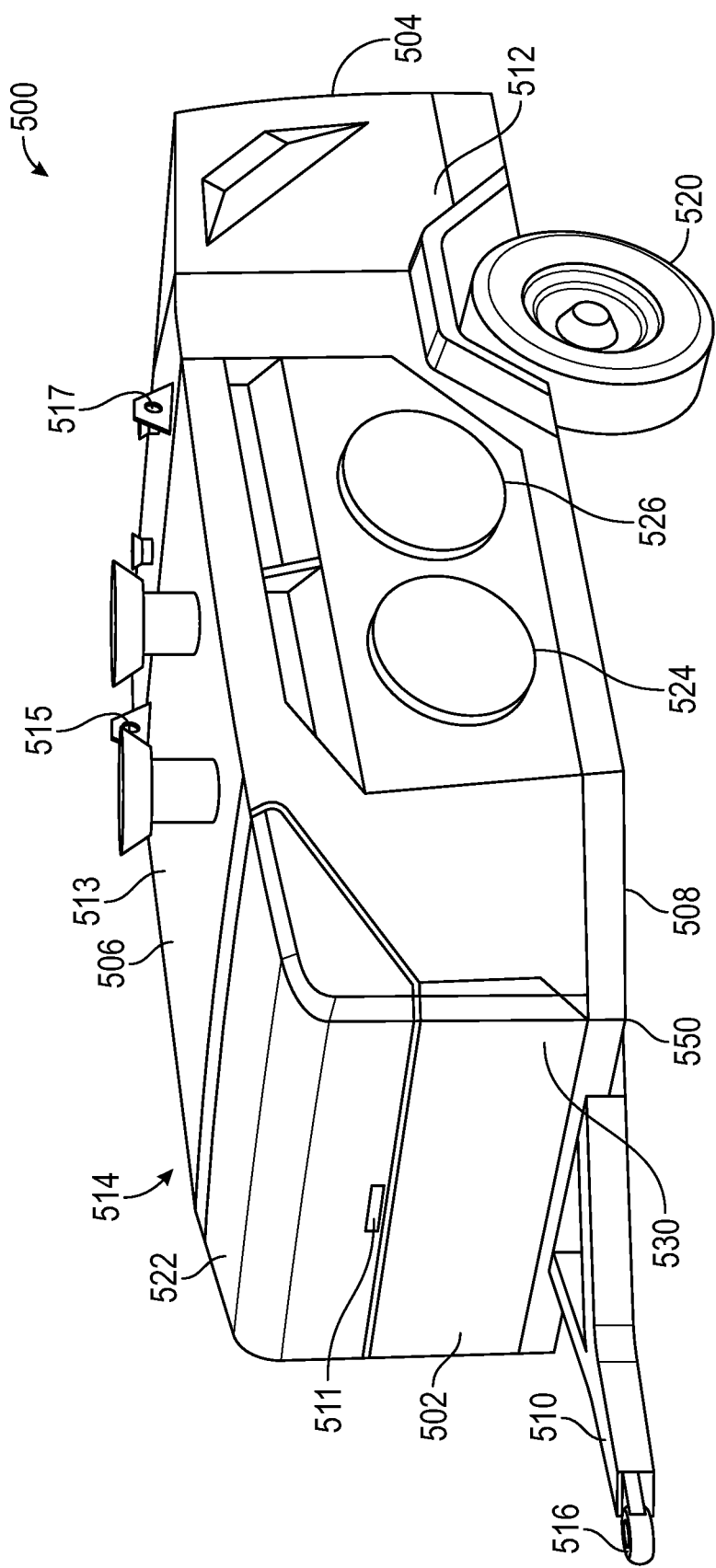
FIG. 25 is a front perspective view of a towable heater, according to an exemplary embodiment.
Figure 26:
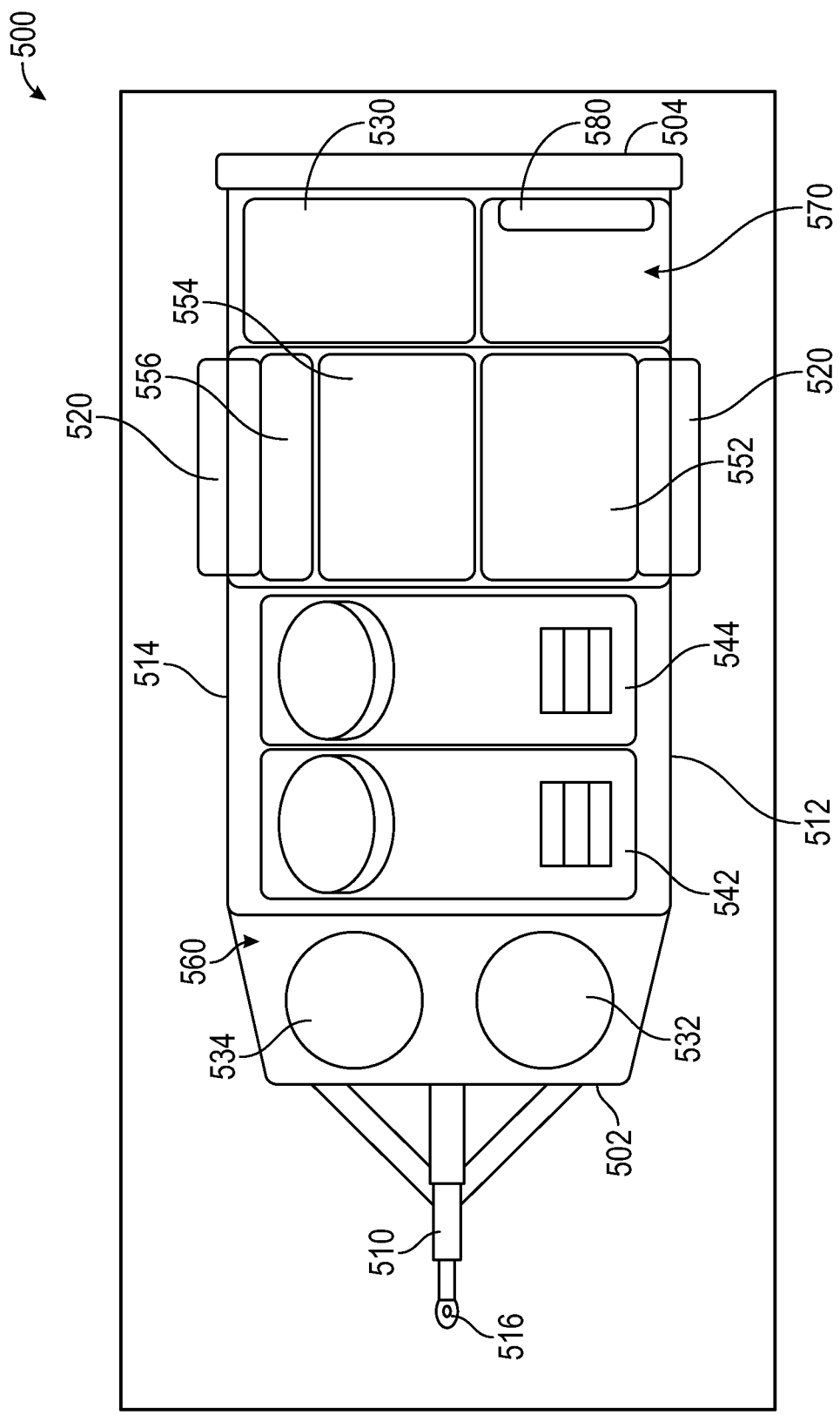
FIG. 26 is a schematic diagram of a top view of the towable heater of FIG. 25.

Referring to FIGS. 25-26, a towable heater 500 is shown, according to an exemplary embodiment. The towable heater 500 includes a housing 513 including a front 502, rear 504, top 506, bottom 508, left side 512, and right side 514. The housing 513 houses the generator and the burners, as well as various other stored items. The towable heater 500 is mounted on and supported by a trailer 550 with a frame 510, a hitch 516, and one or more wheels 520 for portability. The housing 513 includes at least two lift points 515, 517, which can be used to lift the heater 500 off of the trailer 550. Using the two lift points 515, 517, the heater 500 can be removed from the trailer 550 in a balanced fashion.

Referring to FIG. 26, a top schematic view of the towable heater 500 is shown, according to an exemplary embodiment. The towable heater 500 includes a first burner 542, a second burner 544, and a generator 530. A first fuel tank 552 provides fuel to the first burner 542, a second fuel tank 554 provides fuel to the second burner 544, and a third fuel tank 556 provides fuel to the generator 530. The fuel tanks 552, 554, 556 are positioned directly above the wheels 520 (e.g., directly above a wheel axis). In some embodiments, the fuel tanks are otherwise positioned. The generator 530 is positioned rearward of the wheels 520, while the burners 542, 544 are positioned forward of the wheels 520. In some embodiments, the generator and burners are otherwise positioned.

Figure 27:
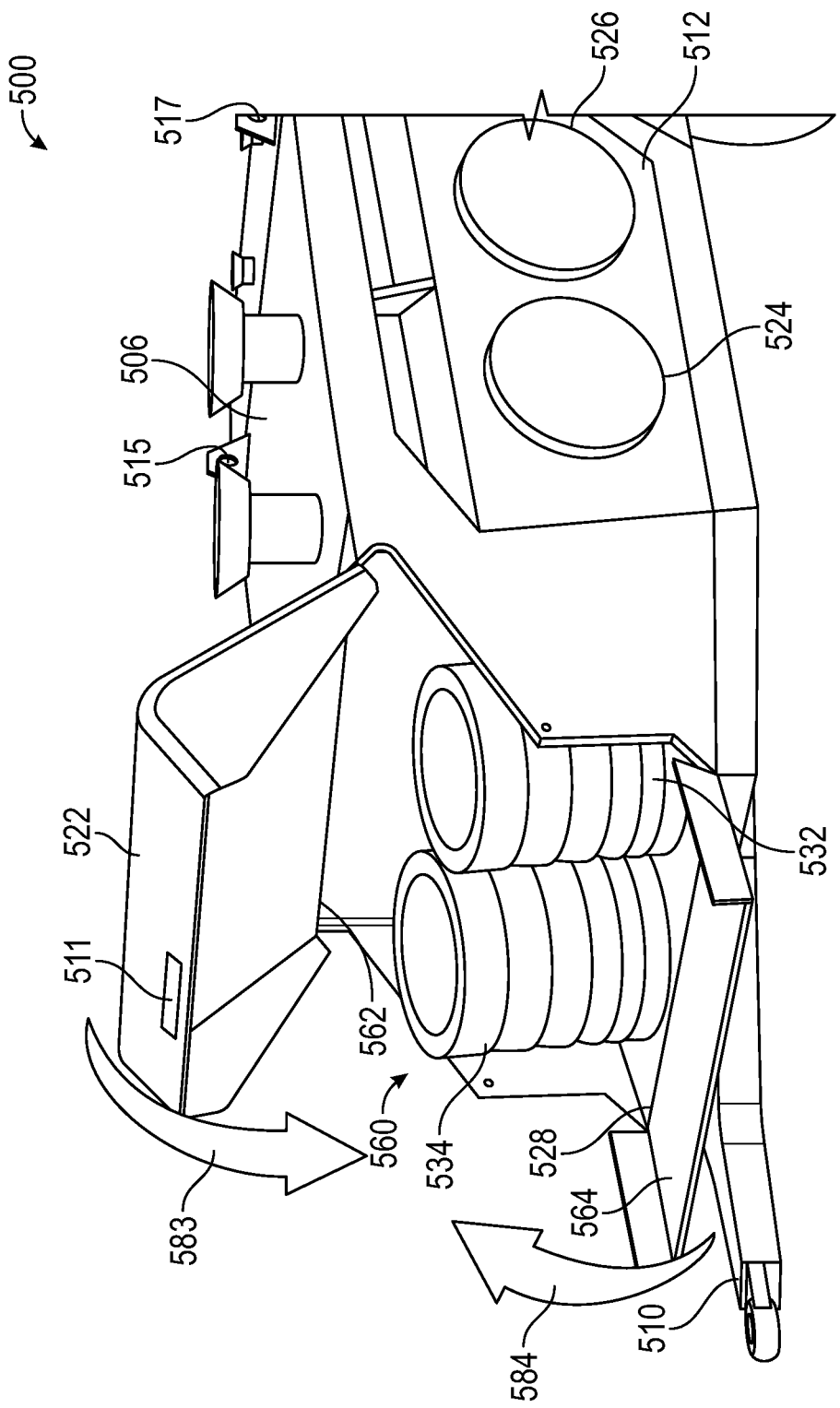
FIG. 27 is a front perspective view of the towable heater of FIG. 25.

Referring to FIG. 27, the towable heater 500 includes a front storage door 522 configured to open upward and outward to provide access to a front storage compartment 560 (e.g., to store one or more ducts 532, 534). The front storage door 522 is formed as part of the front 502 of the housing 513. To open the front storage door 522, an operator can grasp the handle 511 and pull outward and upward, pivoting at hinge 562. As illustrated by arrow 583, the front storage door 522 may pivot downwards about hinge 562 to close. A front wall 564 formed as part of the front 502 of the housing 513 is also configured to open to allow an operator to easily insert items, such as ducts 532, 534. The front wall 564 opens outward and downward, pivoting at hinge 528. As illustrated by arrow 584, the front wall 564 may pivot upwards about hinge 528 to close. In this way, there is more room to maneuver objects in and out of the front storage compartment 560. For example, an operator can open the front wall 564 such that it is not necessary to insert objects at an angle (e.g., diagonally) into the front storage compartment 560. Instead, the operator can easily place items into and remove items from the front storage compartment 560 without worrying about contacting the front wall 564. After placing ducts or other items into the compartment 560 and then closing the front wall 564, the operator can then place more items into the compartment 560 without worrying about the items falling out due to the positioning of the front wall 564. In addition, the operator can easily reach the bottom of the storage compartment 560 (e.g., to reach items fallen to the bottom of the compartment, clean the compartment, etc.). The towable heater 500 includes a first outlet 524 and a second outlet 526 configured to expel heated air from the towable heater 500. The ducts 532, 532 can be removably coupled to the towable heater 500 at either the first outlet 524 or the second outlet 526.

Referring to FIGS. 25-29, the towable heater 500 also includes a rear storage compartment 570. The generator 530 may be positioned in the rear storage compartment 570. The rear storage compartment 570 may include a storage rack 546 configured to hold a duct or other component for use with the towable heater 500. The user interface 580 may be positioned on a rear door 542 within the rear storage compartment 570. The rear door 542 may include a window or screen 582, which aligns with the user interface 580 and through which an operator may view and interact with the user interface 580. The window 582 protects the user interface 580 against environmental conditions, such as rain, snow, heat, sun, etc.

Figure 30:
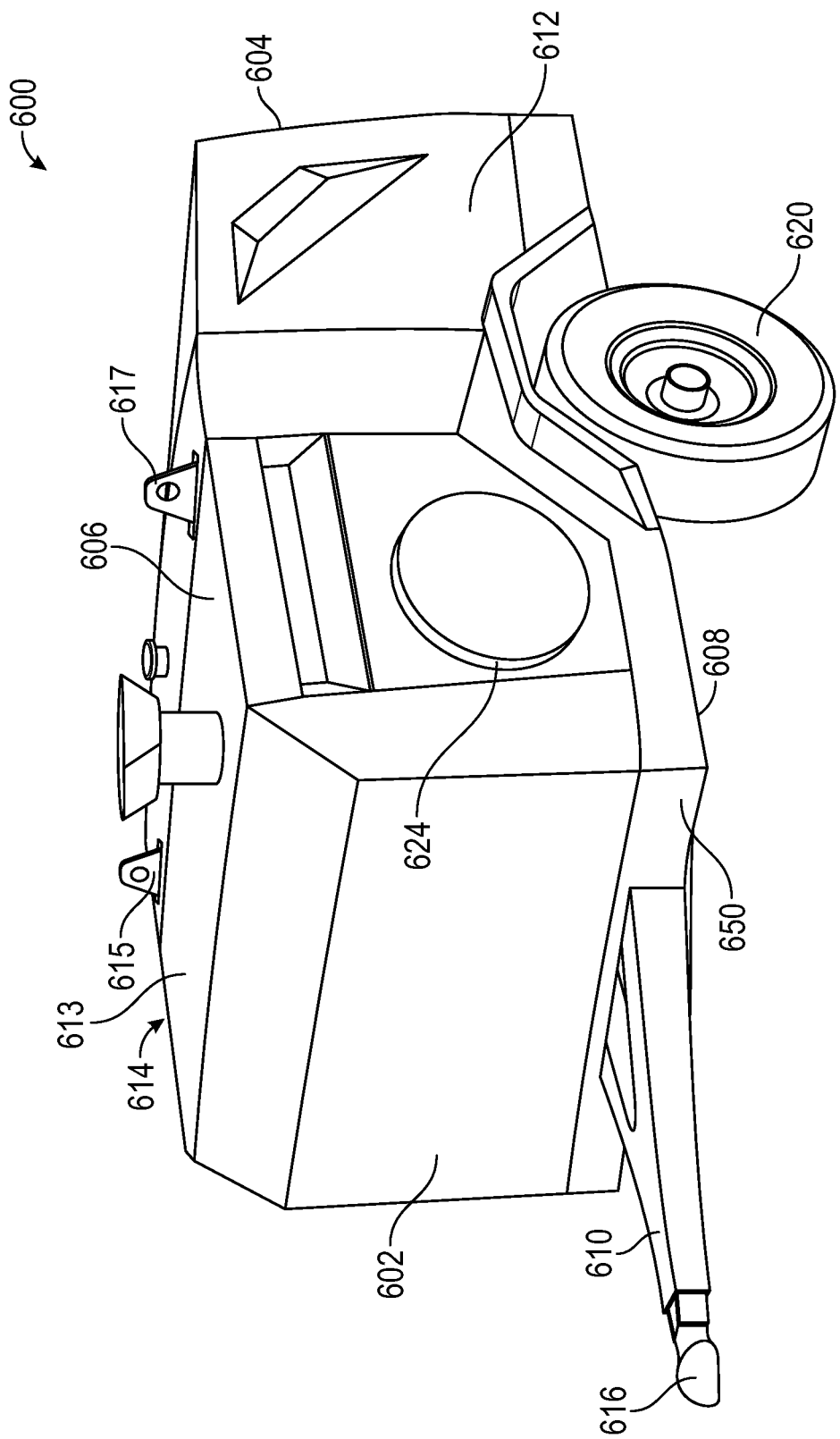
FIG. 30 is a front perspective view of a towable heater, according to an exemplary embodiment.
Figure 31:
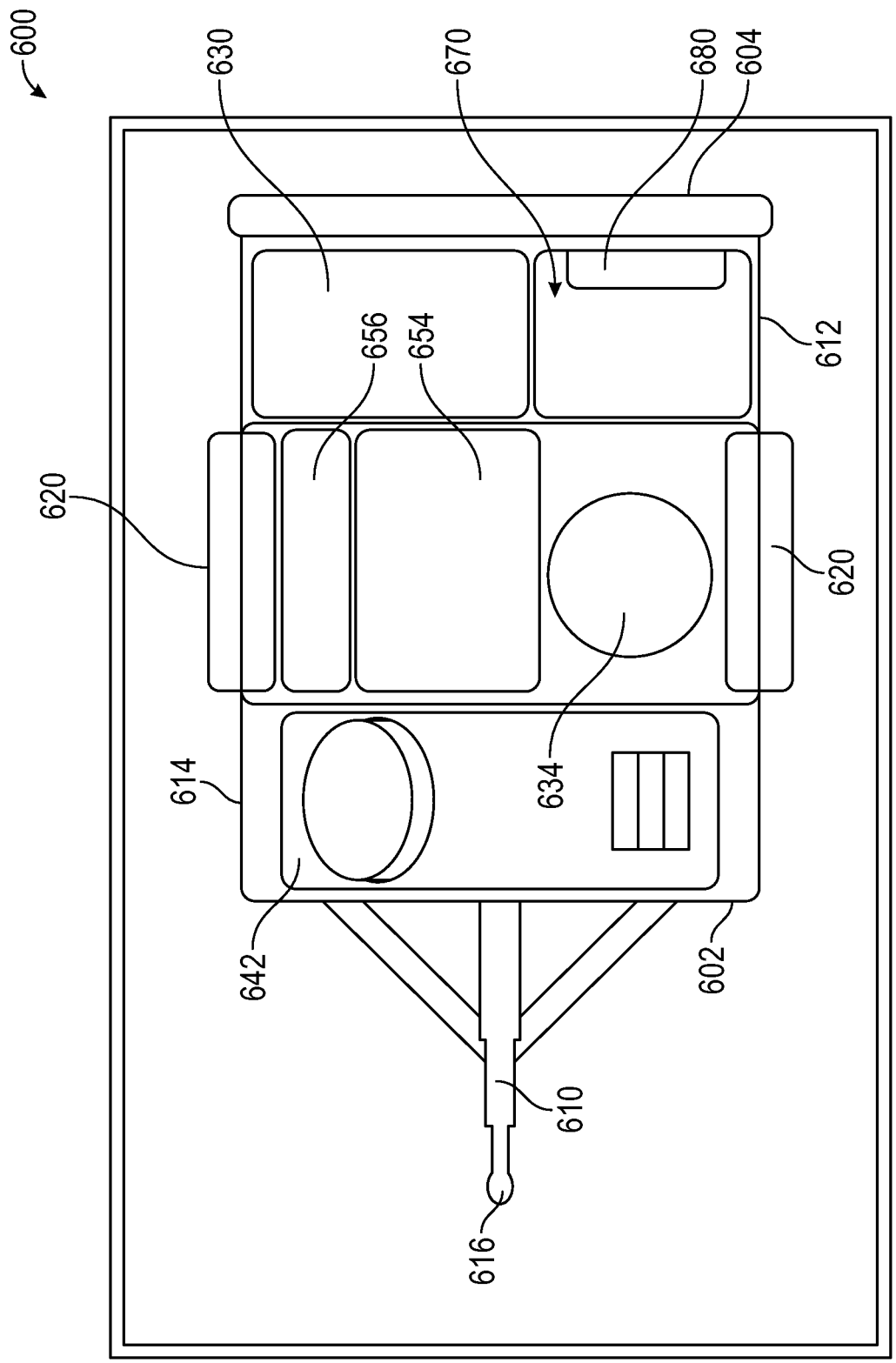
FIG. 31 is a schematic diagram of a top view of the towable heater of FIG. 30.

Referring to FIGS. 30-31, a towable heater 600 is shown, according to an exemplary embodiment. The towable heater 600 includes a housing 613 including a front 602, rear 604, top 606, bottom 608, left side 612, and right side 614. The housing 613 houses the generator and the burners, as well as various other stored items. The towable heater 600 is mounted on and supported by a trailer 650 with a frame 610, a hitch 616, and one or more wheels 620 for portability. The housing 613 includes at least two lift points 615, 617, which can be used to lift the heater 600 off of the trailer 650. Using the two lift points 615, 617, the heater 600 can be removed from the trailer 650 in a balanced fashion. The towable heater 600 includes an outlet 624 configured to expel heated air from the towable heater 600. A duct 634 can be removably coupled to the towable heater 600 at the outlet 524. The towable heater 600 shown in FIGS. 30-31 is similar to the towable heater 500 shown in FIGS. 25-29 except that one less burner is used in the towable heater 600. The towable heater 500 shown in FIGS. 25-29 may be modified (e.g., the housing 513 may be modified) to create the towable heater 600 shown in FIGS. 30-31. For example, one or more panels from each of the top 506, bottom 508, and sides 512, 514 may be removed to modify the towable heater to a smaller, more compact size (e.g., shorter in length, etc.) when a single burner is used.

Referring to FIG. 31, a top schematic view of the towable heater 600 is shown, according to an exemplary embodiment. The towable heater 600 includes a burner 642 and a generator 630. A first fuel tank 654 provides fuel to the burner 642 and a second fuel tank 656 provides fuel to the generator 630. The fuel tanks 654, 656 are positioned directly above the wheels 620 (e.g., directly above a wheel axis). In some embodiments, the fuel tanks are otherwise positioned.

Figure 32:
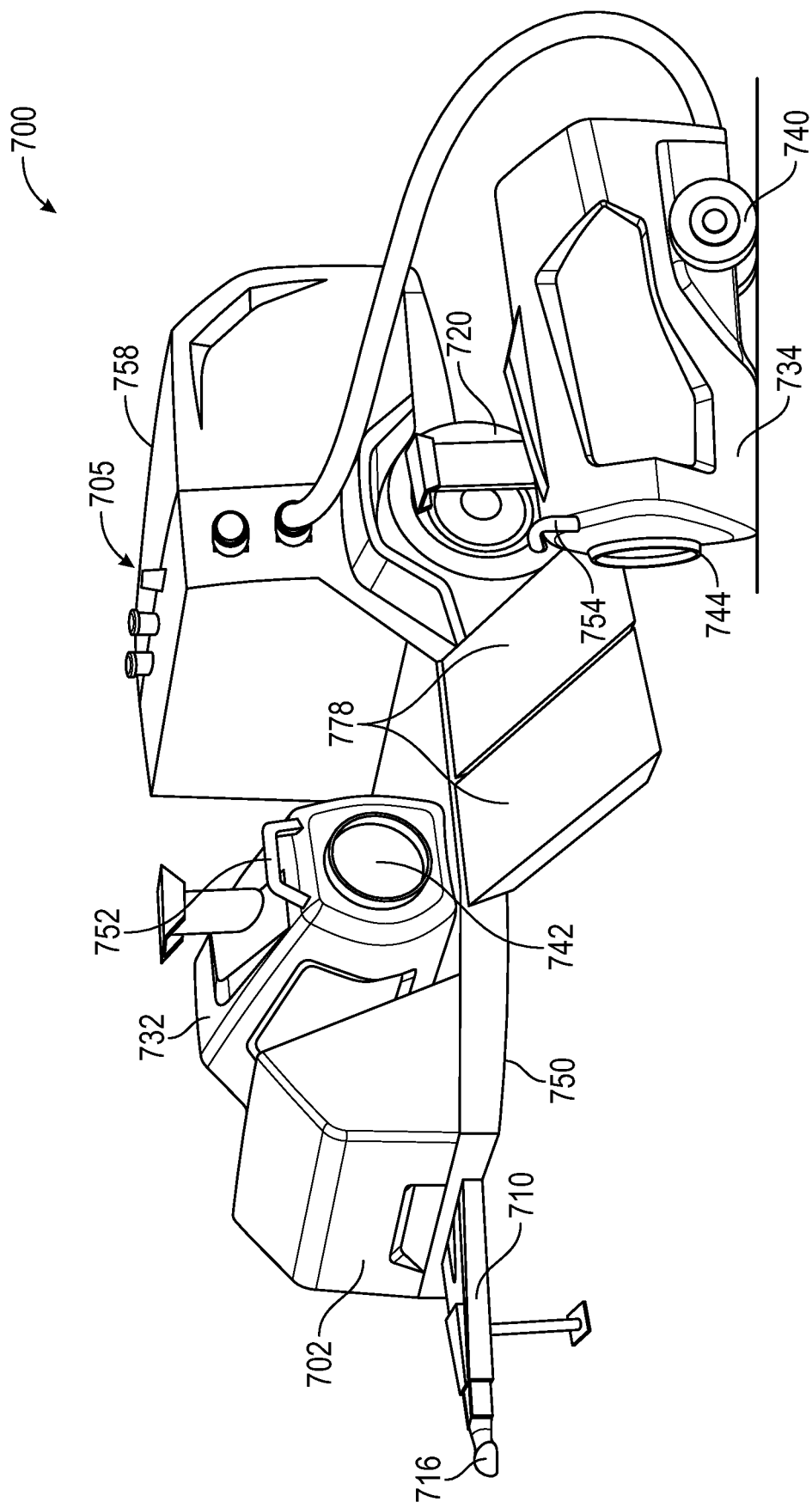
FIG. 32 is a front perspective view of a towable heater assembly, according to an exemplary embodiment.
Figure 33:
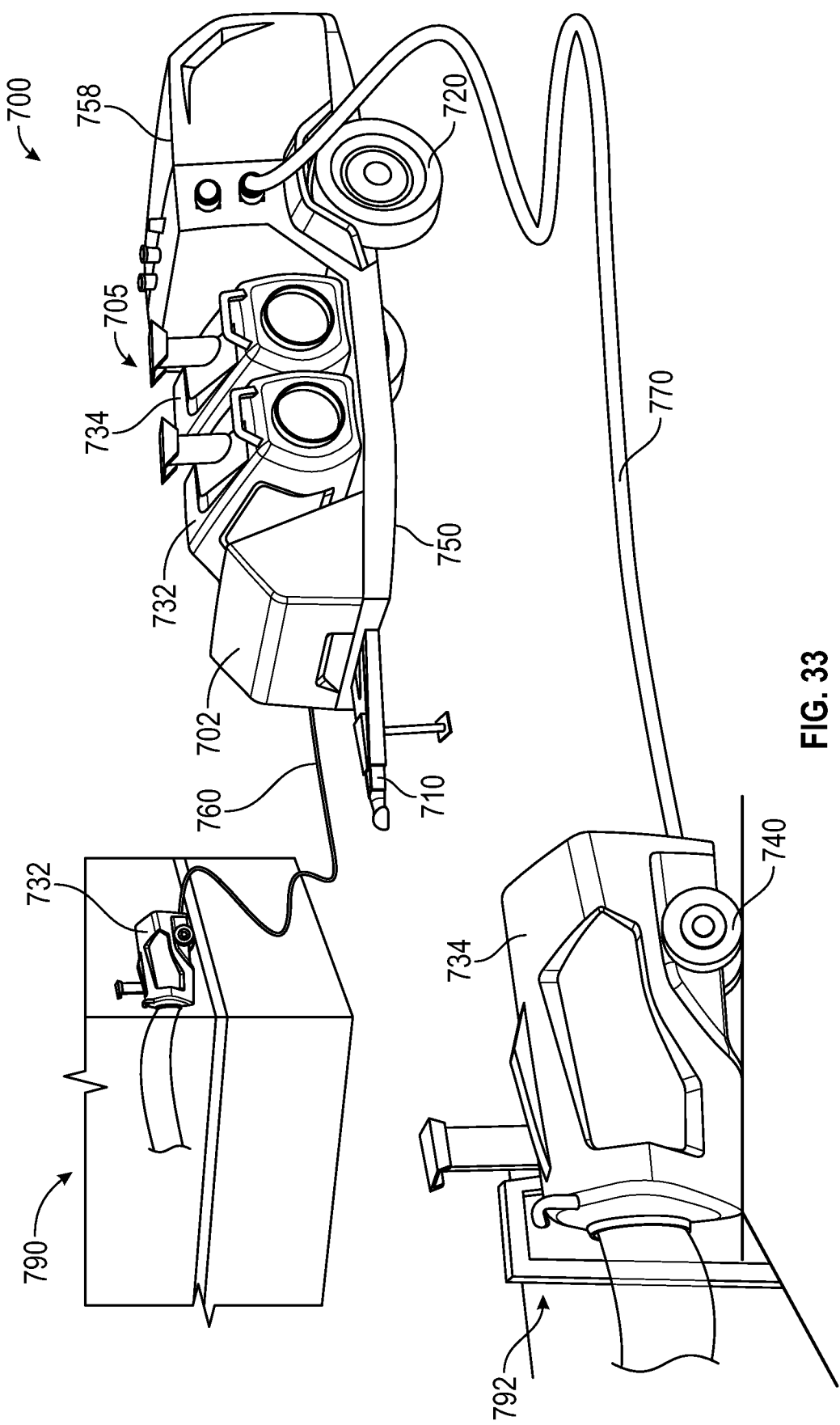
FIG. 33 is a front perspective view of the towable heater assembly of FIG. 32 in an example use environment.

Referring to FIGS. 32-33, a towable heater assembly 700 is shown. The towable heater assembly 700 includes a front compartment 702 and one or more removable heating units 732, 734 supported by a trailer 750 with a frame 710, a hitch 716, and one or more wheels 720. The front compartment 702 may store hoses or conduits 760, 770. The removable heating units 732, 734 each include a burner housed therein and a heated air outlet 742, 744. Heated air exits the removable heating units 732, 734 through the heated air outlets 742, 744. While positioned remotely, the removable heating units 732, 734 are still controlled at the main towable heater portion 705. Each of the removable heating units 732, 734 are connected to and controlled by the generator positioned in rear portion 758 (e.g., via conduits or hoses 760, 770 respectively). The conduits 760, 770 also provide fuel and electricity to the removable heating units 732, 734.

The removable heating units 732, 734 each include wheels 740 allowing an operator to easily move the heating units 732, 734 around (e.g., roll around) and to and from locations remote from the trailer 750 and the rest of the towable heater assembly 700. Each of the removable heating units 732, 734 include a handle 752, 754 configured to be grasped by an operator. For example, to move the second removable heating unit 734, an operator can first place the one or more ramps 778 in position proximate the side of the towable heater assembly 700, grasp the handle 754, and pull to roll the second removable heating unit 734 down the ramp 778 to a remote location. As shown in FIG. 33, the removable heating units 732, 734 can be used in various locations, such as positioned through an open door 792 or on a second floor of a building 790.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

Unless described differently above, the terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A portable heater comprising:
   a housing comprising an air inlet and an air outlet;
   one or more burners housed within the housing and configured to heat air passing through the housing from the air inlet to the air outlet;
   a storage compartment comprising a bottom wall and a side wall each pivotably coupled to the housing, the side wall forming an outer side surface of the portable heater; and
   a duct positioned in the storage compartment of the housing, the duct comprising a first end coupled to the bottom wall and a second end extendable from the housing when a door of the storage compartment comprising the side wall is in an open position, the duct configured to pivot along with the bottom wall.

2. The portable heater of claim 1, wherein the bottom wall is substantially horizontal when the door is in a closed position and substantially vertical when the door is in the open position.

3. The portable heater of claim 2, wherein the duct extends in a substantially perpendicular direction from the bottom wall.

4. The portable heater of claim 3, wherein the duct is configured to expand from a first length to a second length, the first length being less than a height of the storage compartment, and the second length being longer than a height of the storage compartment.

5. The portable heater of claim 2, further comprising a hinge coupling the door to the housing.

6. The portable heater of claim 5, wherein the door is configured to rotate from the open position to the closed position when the second end of the duct is pushed toward the first end of the duct.

7. The portable heater of claim 1, wherein the side wall of the door is configured to form at least a portion of a ramp when the door is in the open position, the ramp configured to support the duct.

8. The portable heater of claim 7, wherein the door further comprises a top wall pivotably coupled to the side wall, wherein the top wall forms a top of the storage compartment when the door is in a closed position and forms a portion of the ramp when the door is in the open position.

9. The portable heater of claim 1, wherein the door comprises a top wall coupled to the side wall, wherein the side wall forms a portion of a side of the housing, and the top wall forms a portion of a top of the housing.

10. The portable heater of claim 9, wherein the duct is configured to be condensed to fit in the storage compartment between the top wall and the bottom wall when the door is in a closed position.

11. A portable heater comprising:
a housing comprising a storage compartment, a door providing access to the storage compartment and comprising a window, an air inlet, and an air outlet;
a burner housed within the housing and configured to heat air passing through the housing from the air inlet to the air outlet;
a generator positioned in the storage compartment and selectively providing power to the burner;
a controller operably coupled to and configured to control operation of the burner and operation of the generator; and
a user interface positioned in the storage compartment and operably coupled to the controller and configured to receive inputs from an operator, wherein the controller is configured to control a supply of power from the generator to the burner based on an input from the user interface, wherein the user interface is aligned with and viewable through the window from outside the housing.

12. The portable heater of claim 11, wherein the controller is configured to control the user interface to indicate a status of the portable heater based on a color of the user interface.

13. The portable heater of claim 11, wherein the controller is configured to provide status information and performance information about the portable heater to the user interface for display.

14. The portable heater of claim 13, wherein the status information and performance information comprise at least one of an operating temperature of the burner, a burner output, a generator output, an operating pressure of the burner, an engine speed of the generator, or a fuel level of the generator or the burner.

* * * * *